(12) United States Patent
Son

(10) Patent No.: US 8,403,592 B2
(45) Date of Patent: Mar. 26, 2013

(54) GRASS PROTECTION MAT

(76) Inventor: Chang Sub Son, Gyunggi-do (KR)

( * ) Notice: Subject to any disclaimer, the term of this patent is extended or adjusted under 35 U.S.C. 154(b) by 814 days.

(21) Appl. No.: 12/438,676

(22) PCT Filed: Aug. 24, 2007

(86) PCT No.: PCT/KR2007/004092
§ 371 (c)(1),
(2), (4) Date: Feb. 24, 2009

(87) PCT Pub. No.: WO2008/023964
PCT Pub. Date: Feb. 28, 2008

(65) Prior Publication Data
US 2010/0293848 A1   Nov. 25, 2010

(30) Foreign Application Priority Data

Aug. 25, 2006   (KR) .................. 10-2006-0081358
Aug. 28, 2006   (KR) .................. 10-2006-0081817
Jun. 5, 2007    (KR) .................. 10-2007-0055180
Jun. 5, 2007    (KR) .................. 10-2007-0055181
Aug. 9, 2007    (KR) .................. 10-2007-0080364

(51) Int. Cl.
*E01C 9/08* (2006.01)
*E04F 11/16* (2006.01)

(52) U.S. Cl. ................ 404/35; 404/36; 52/177

(58) Field of Classification Search ........ 404/35, 404/36, 40; 52/177, 506.05, 512, 583.1, 52/155; 428/54, 44; 135/118; 47/41.14, 47/66.3
See application file for complete search history.

(56) References Cited

U.S. PATENT DOCUMENTS 3,821,064 A * 6/1974 Cima ........................ 472/90
3,959,542 A * 5/1976 Livermore .................. 428/44

(Continued)

FOREIGN PATENT DOCUMENTS

CN   2508543 Y   9/2002
CN   1411692 A   4/2003

(Continued)

OTHER PUBLICATIONS

Chinese Office Action for corresponding application No. 200780031666.1 issued on Jun. 17, 2010.

(Continued)

*Primary Examiner* — Thomas B Will
*Assistant Examiner* — Abigail A Risic
(74) *Attorney, Agent, or Firm* — Renner, Otto, Boisselle & Sklar, LLP

(57) ABSTRACT

The present invention provides a grass protection mat which can be used for protection of grass in a golf course, a grass field, and a park lawn, or be used for growth of the grass. The grass protection mat includes a body member constituting grass penetrating spaces, protruding pillars formed at upper portion of the body member, lug members formed at lower portion of the body member, and an outer frame provided at outer wall of the body member. The grass protection mat further includes sinking prevention means provided across the grass penetrating spaces formed at the lower portion of the mat, elastically deformable sinking prevention means, mat sliding prevention means provided to the sinking prevention means, and sliding prevention means. The invention may obtain improve effects that the grass protection mat prevents the mat from sinking into a ground after construction of the mat on the ground, enhances sinking prevention effect by elastically deforming the sinking prevention means, while preventing the mat sinking, restrains the mat from slipping through the mat sliding prevention means provided to the sinking prevention means under or after construction of the mat, and effectively prevents from sliding on the mat during passage of the mat.

7 Claims, 46 Drawing Sheets

U.S. PATENT DOCUMENTS

| | | | | |
|---|---|---|---|---|
| 4,111,585 | A | * | 9/1978 | Mascaro .......................... 404/70 |
| D260,107 | S | * | 8/1981 | Mittmann ..................... D21/760 |
| 4,584,221 | A | * | 4/1986 | Kung .............................. 428/44 |
| 5,689,912 | A | * | 11/1997 | Prestele .......................... 404/36 |
| 6,585,449 | B2 | * | 7/2003 | Chen ................................. 404/2 |
| 6,962,464 | B1 | * | 11/2005 | Chen ................................ 405/43 |
| 7,108,454 | B2 | * | 9/2006 | Blackwood ..................... 405/36 |
| 7,201,538 | B2 | * | 4/2007 | Blackwood et al. ............ 405/50 |
| 7,210,876 | B2 | * | 5/2007 | Moralez et al. ................. 404/36 |
| 2002/0122912 | A1 | * | 9/2002 | Brock et al. ..................... 428/44 |

FOREIGN PATENT DOCUMENTS

| | | |
|---|---|---|
| JP | 08-57111 | 3/1996 |
| JP | 08-269906 | 10/1996 |
| KR | 20-354896 | 7/2004 |
| KR | 20-381257 | 4/2005 |
| KR | 20-413552 | 4/2006 |
| KR | 20-0416783 | 5/2006 |
| WO | 2006/080751 | 8/2006 |

OTHER PUBLICATIONS

English translation of Chinese Office Action for corresponding application No. 200780031666.1 issued on Jun. 17, 2010.

Korean Office Action for corresponding application No. 10-2007-0080364 issued Jun. 12, 2009.

Chinese Office Action for corresponding Application No. 201010534094.2 issued on Jan. 21, 2012.

English translation of Chinese Office Action for corresponding Application No. 201010534094.2 issued on Jan. 21, 2012.

* cited by examiner

[Fig. 1]
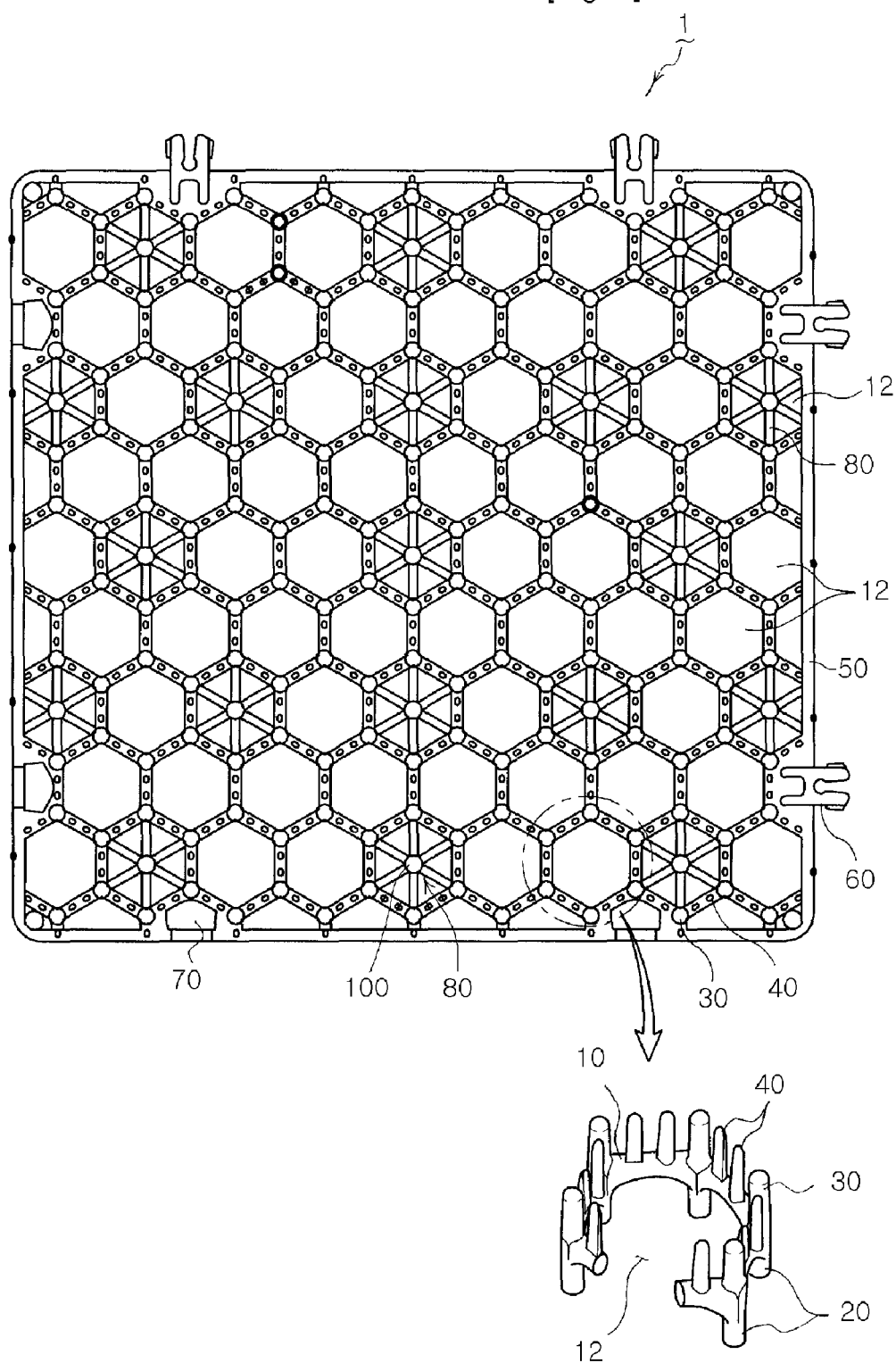

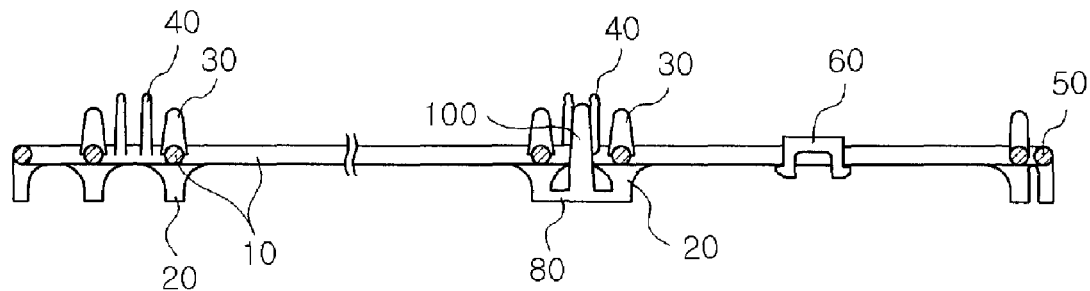
[Fig. 2]

[Fig. 3]
(a)
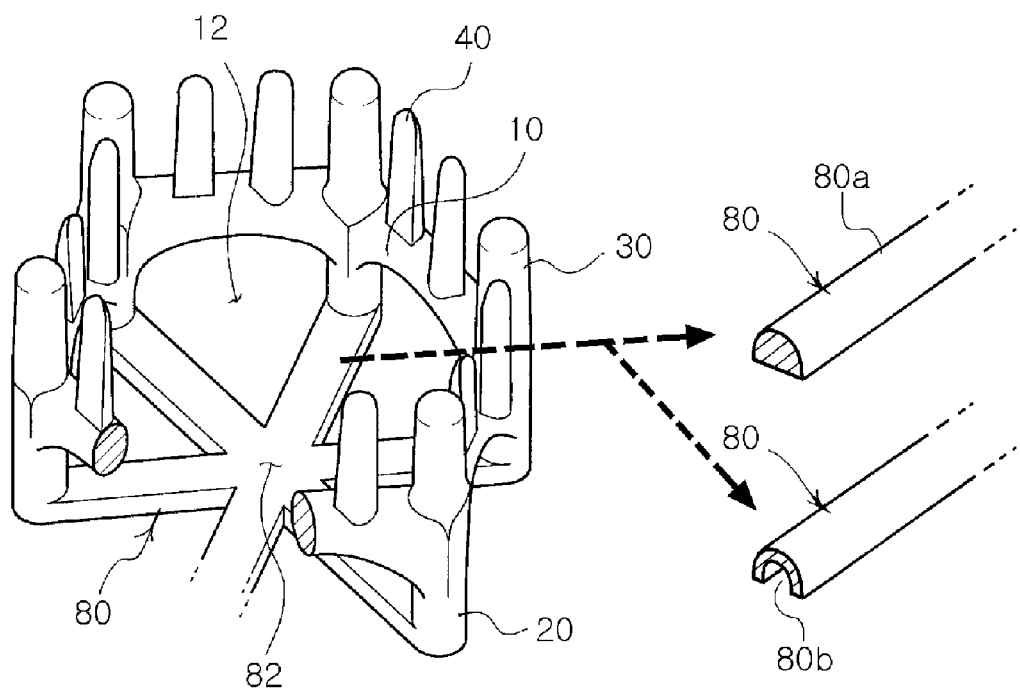
(b)
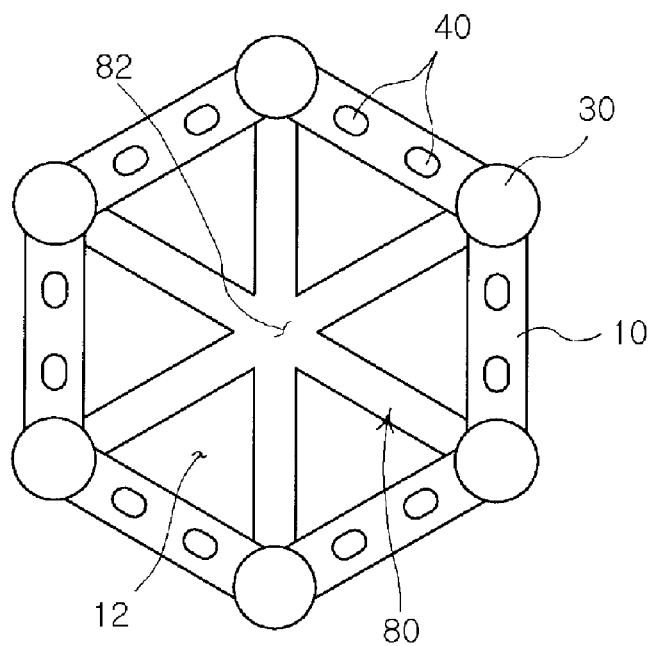

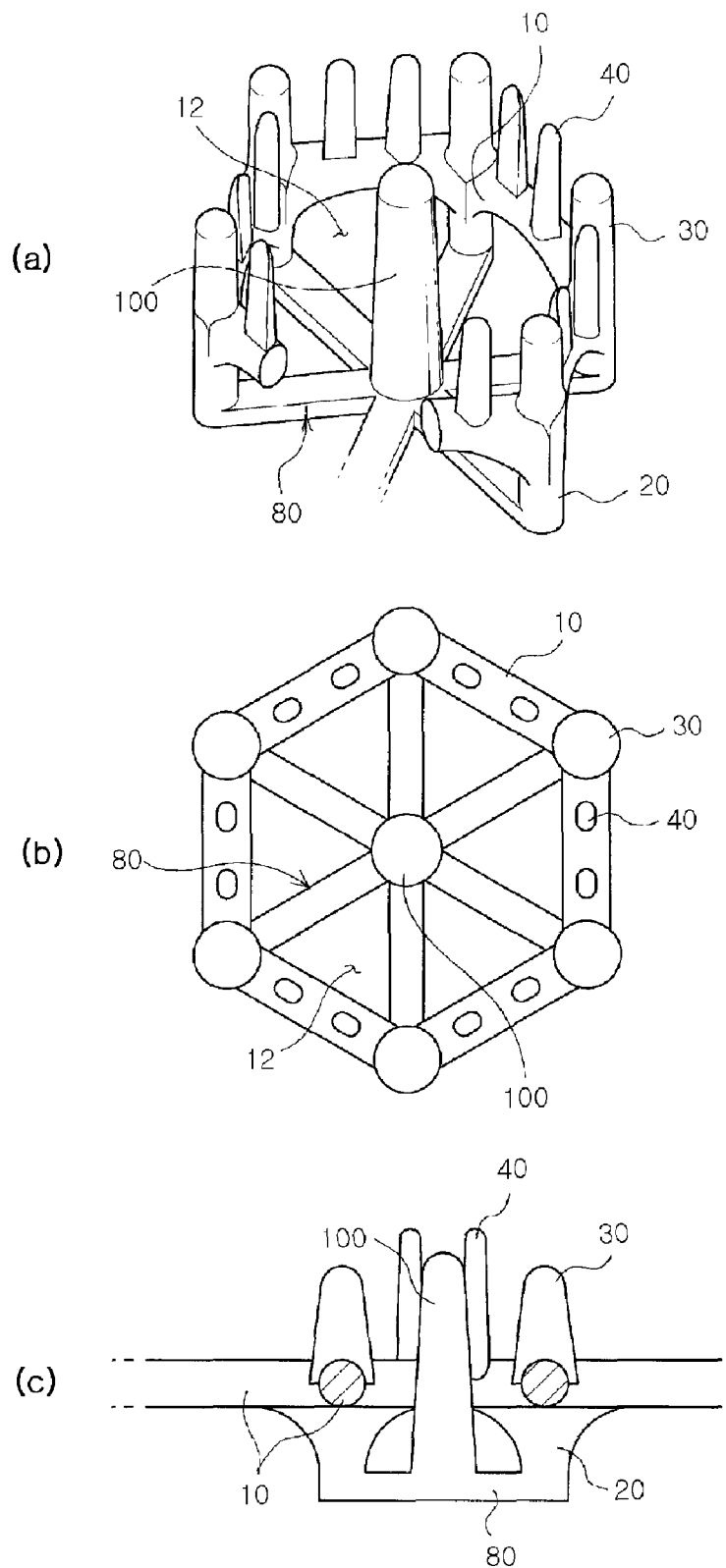

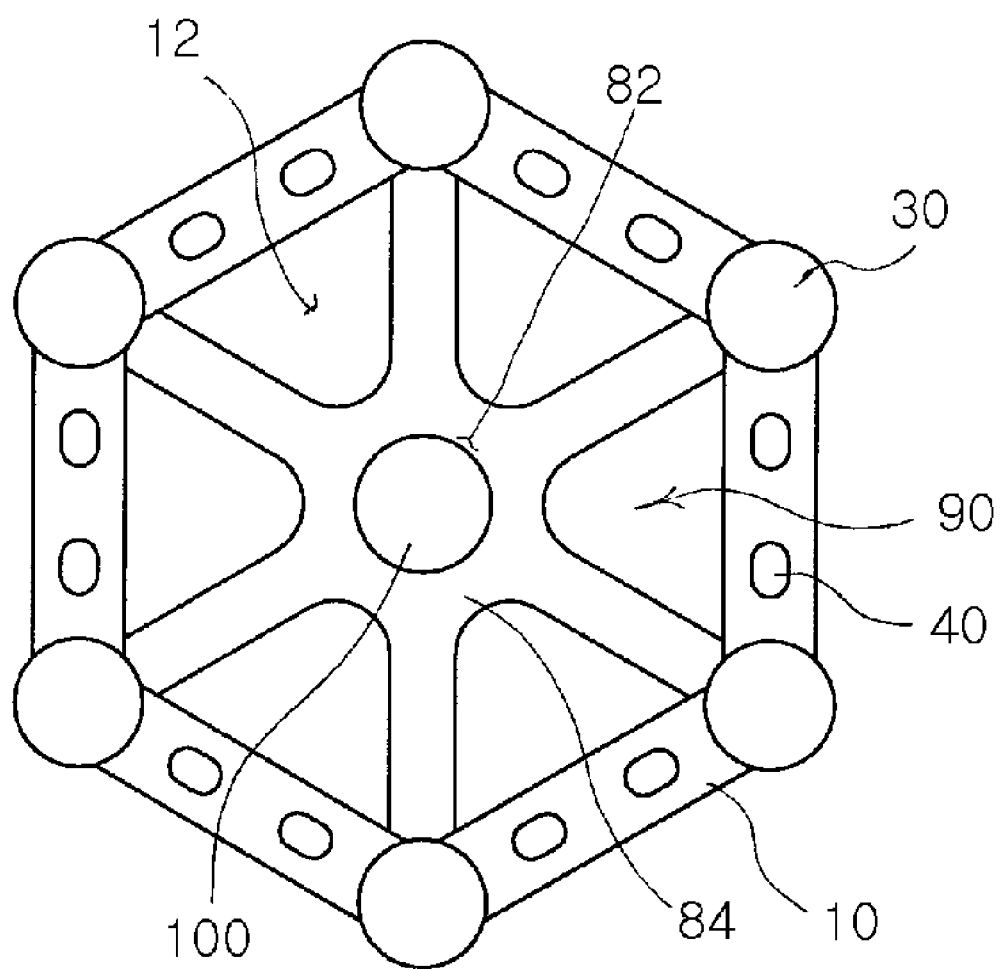

[Fig. 6]
(a)
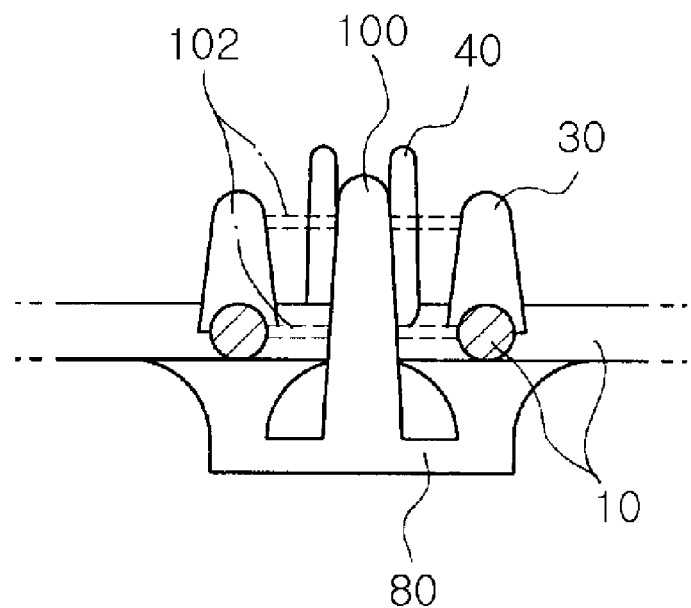
(b)
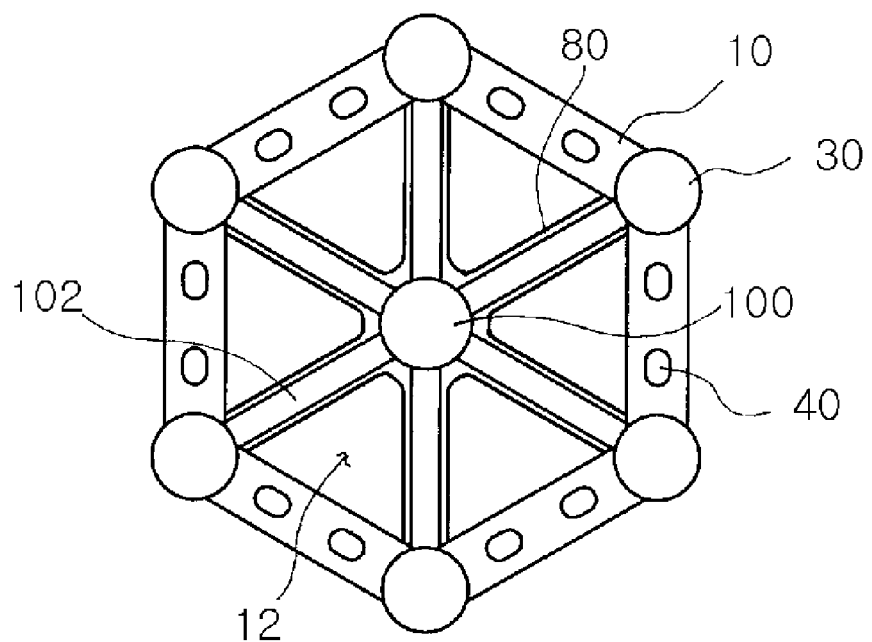

[Fig. 7]
(a)
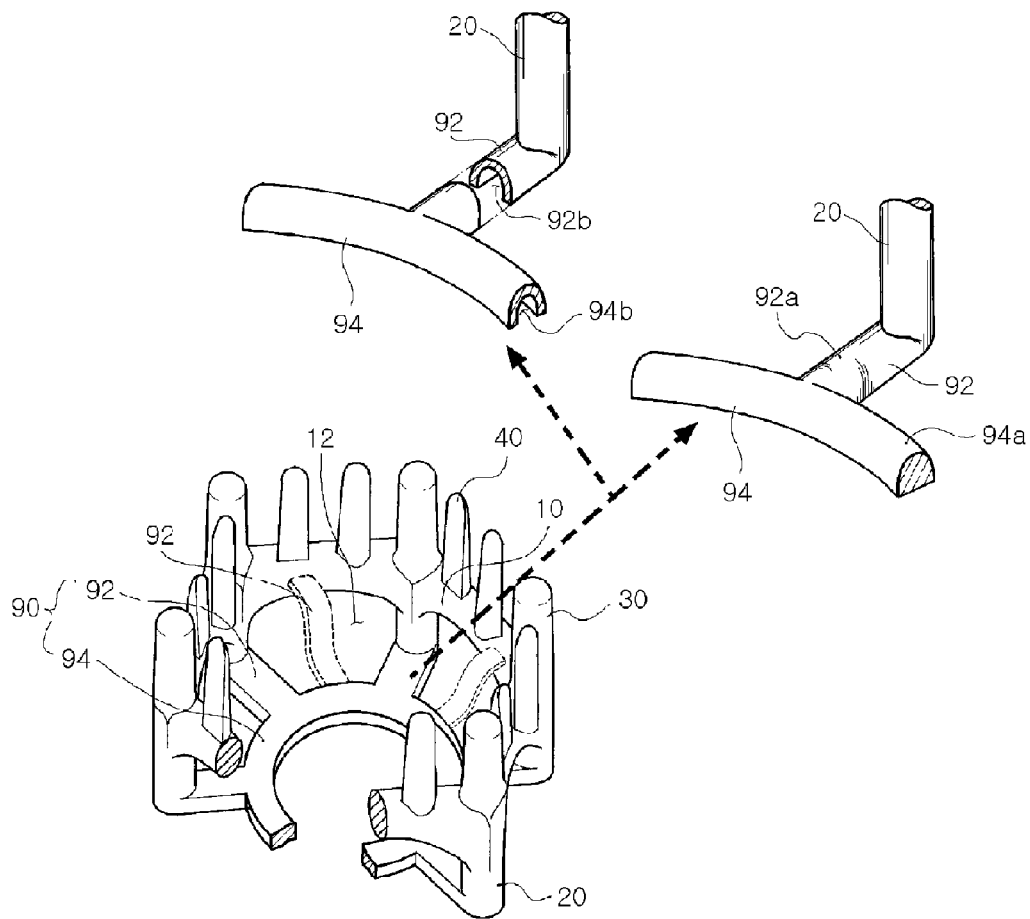
(b)
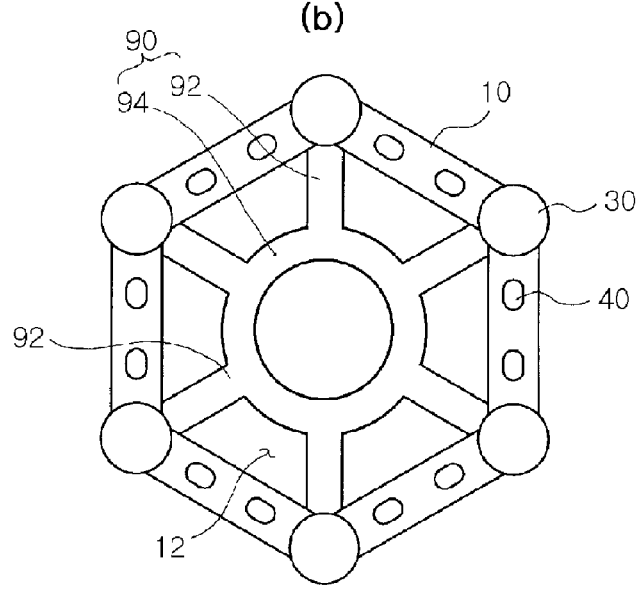

[Fig. 8]
(a)
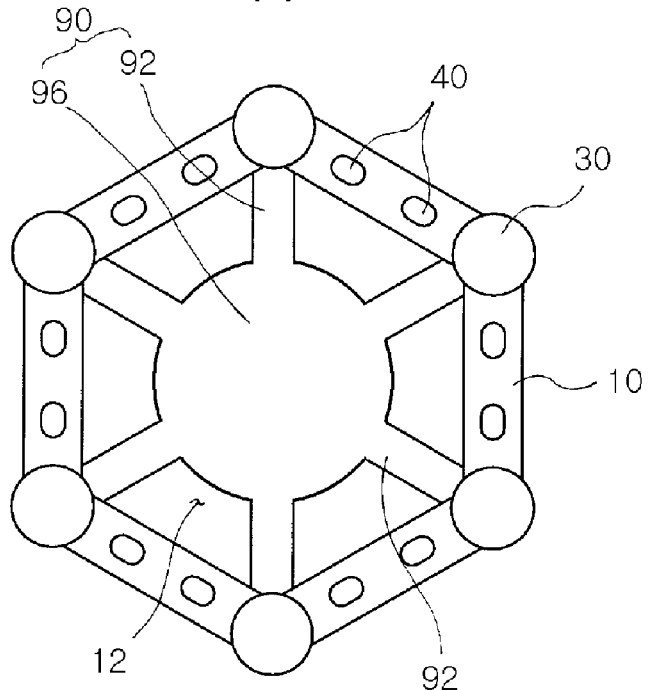
(b)
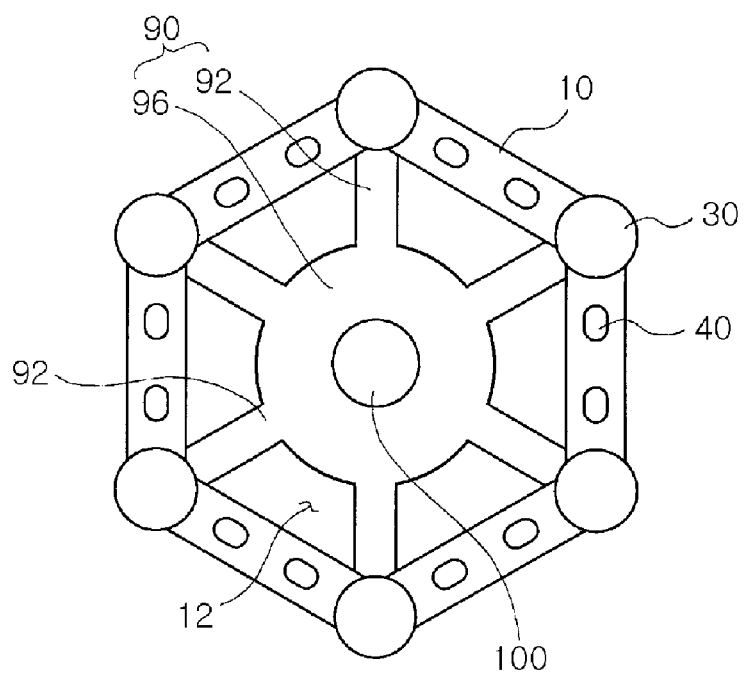

[Fig. 9]
(a)
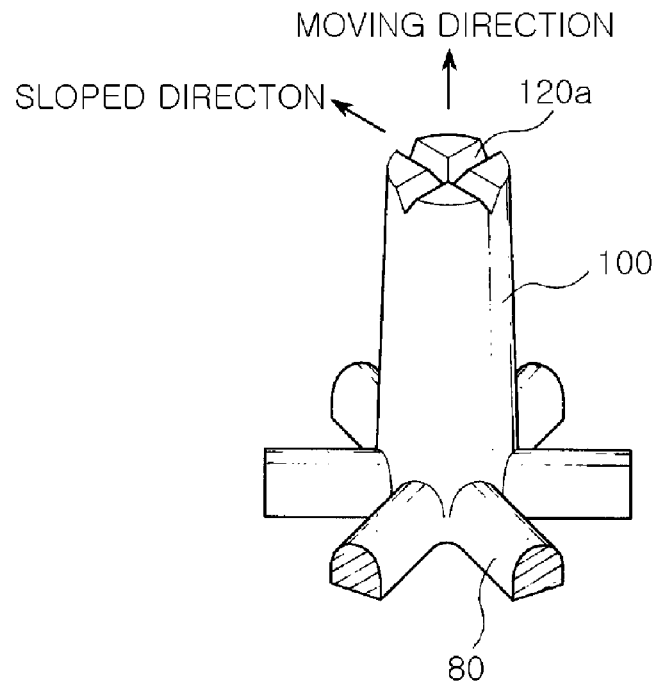
(b)
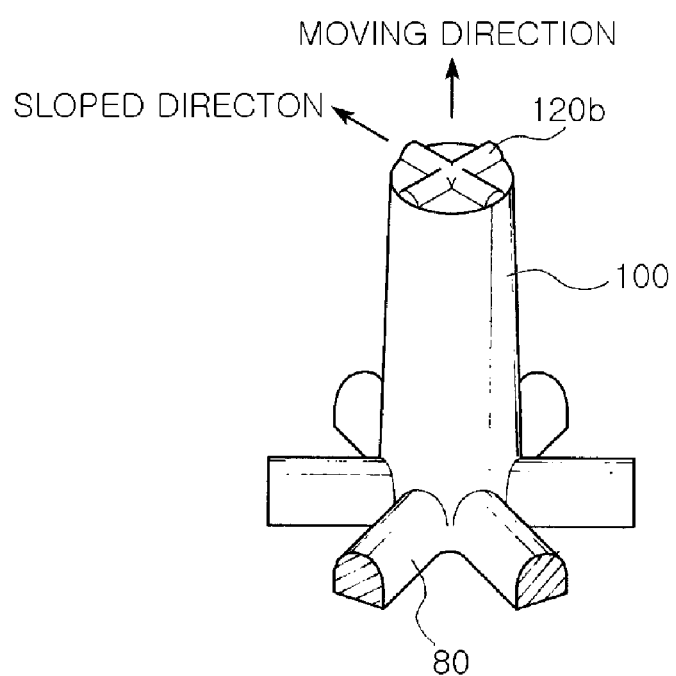

[Fig. 10]
(a)
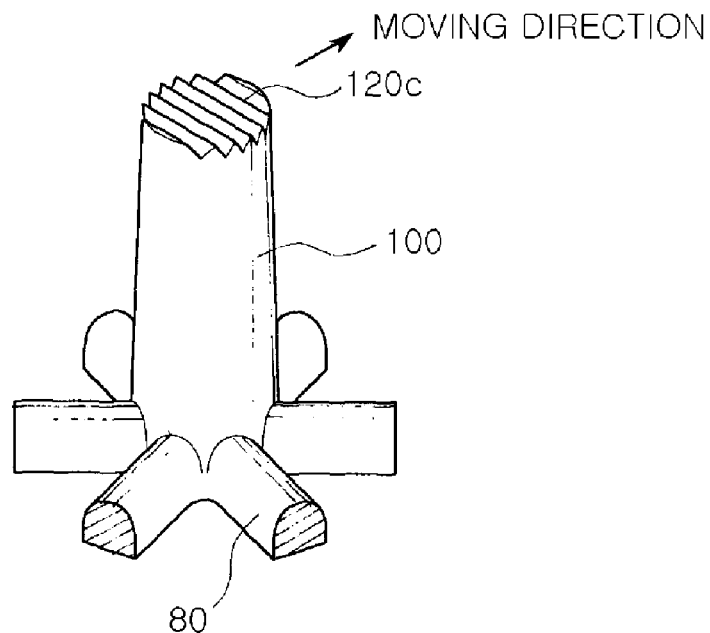
(b)
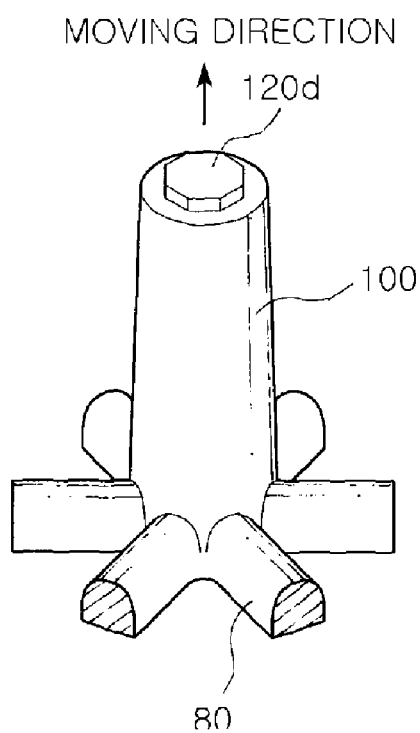

[Fig. 11]
(a)
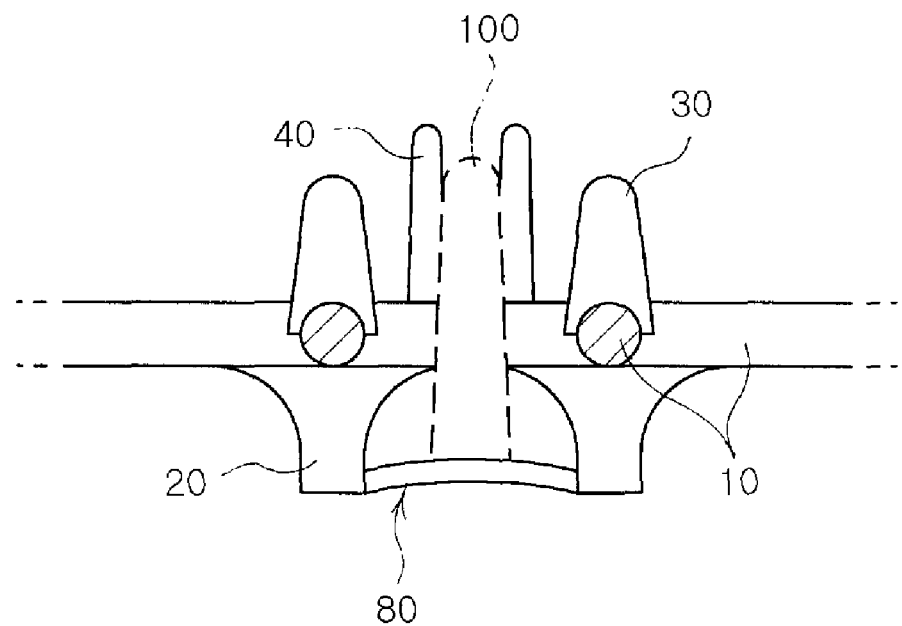
(b)
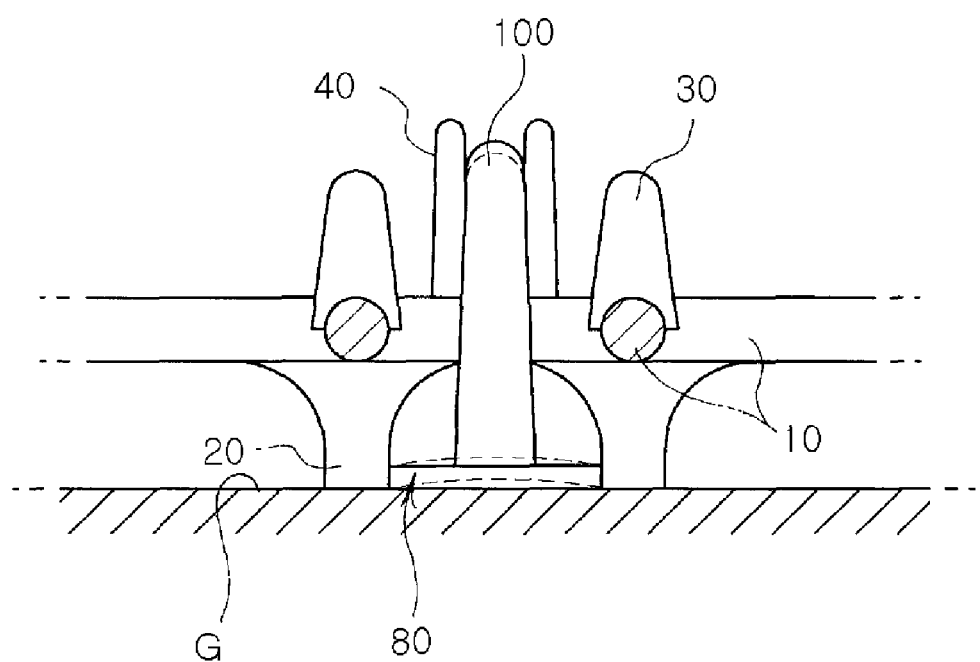

[Fig. 12]
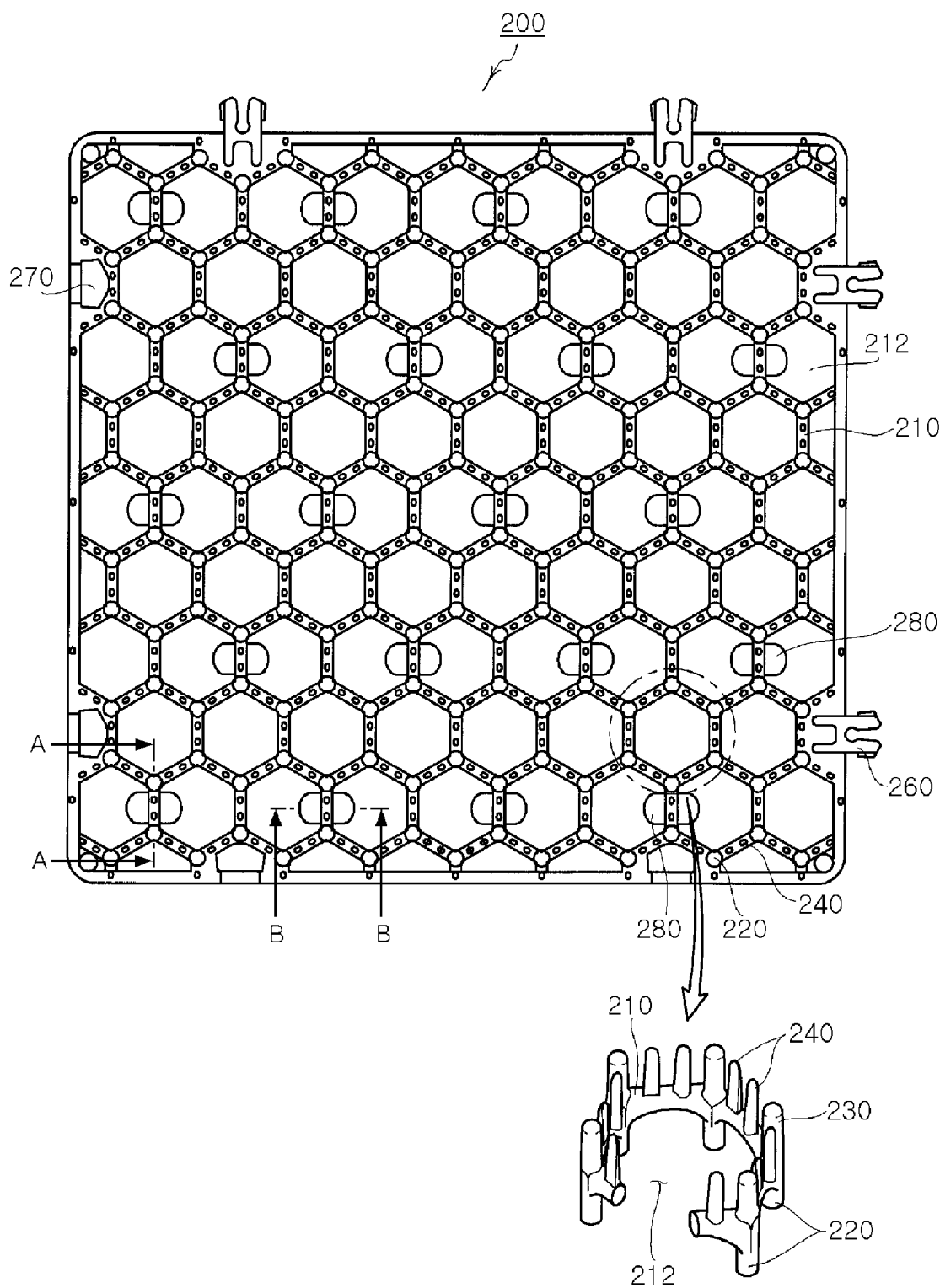

[Fig. 13]
(a)
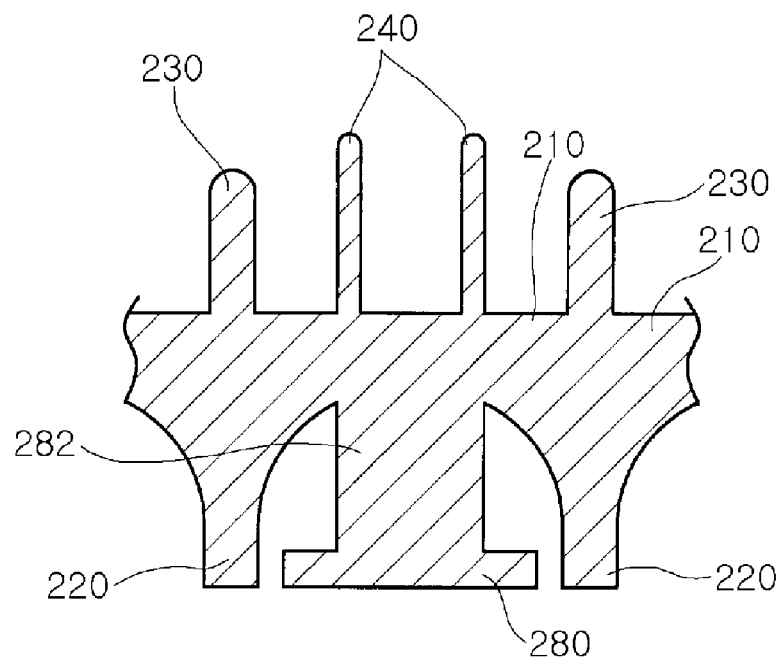
A-A
(b)
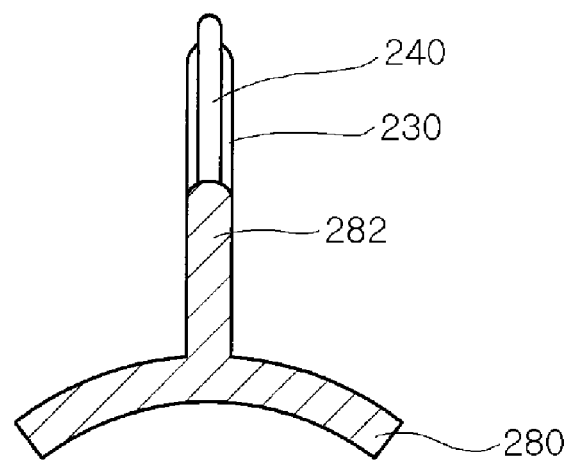
B-B

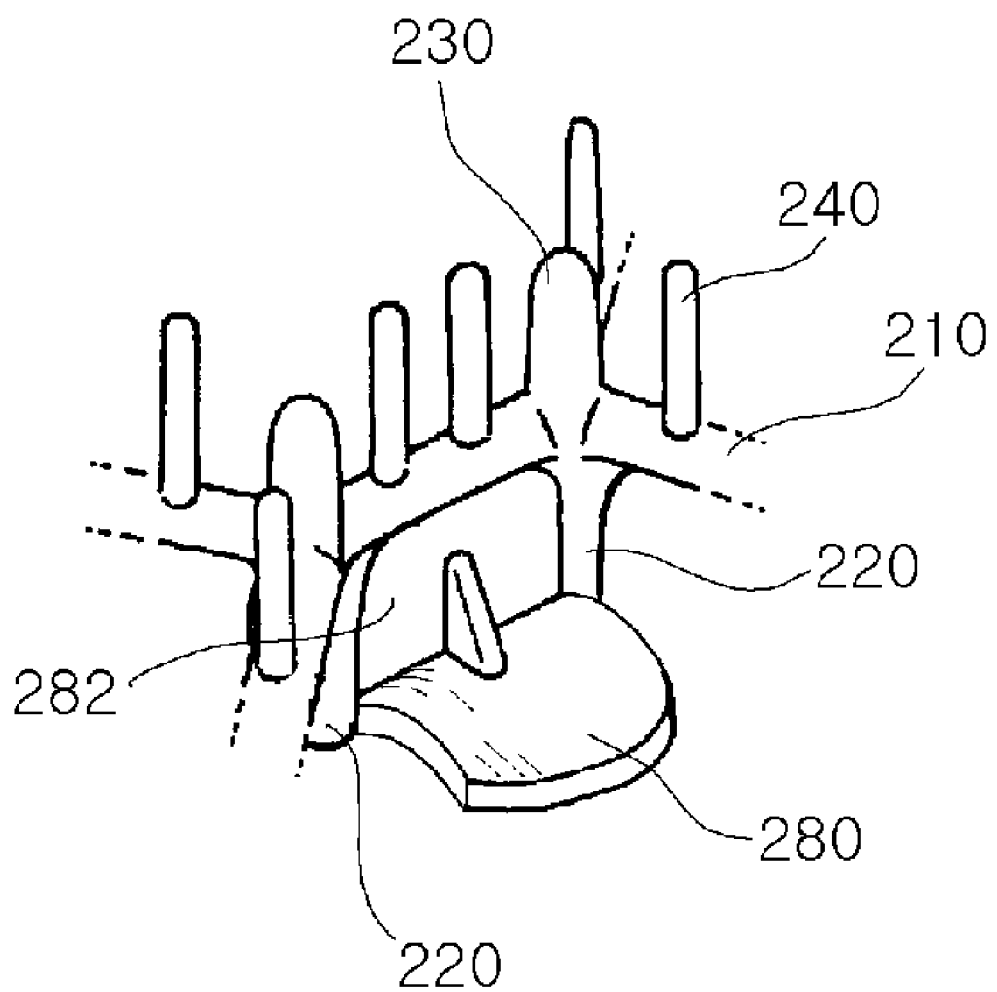
[Fig. 14]

[Fig. 15]
(a)
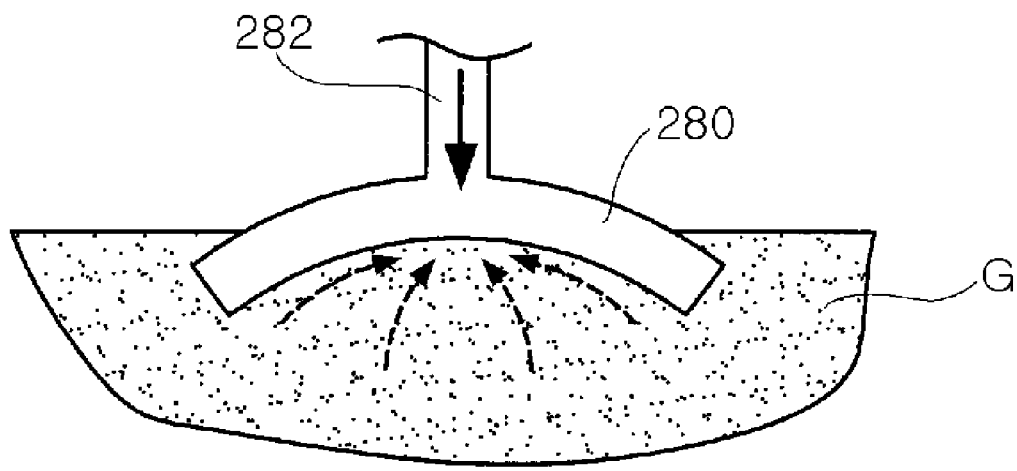
(b)
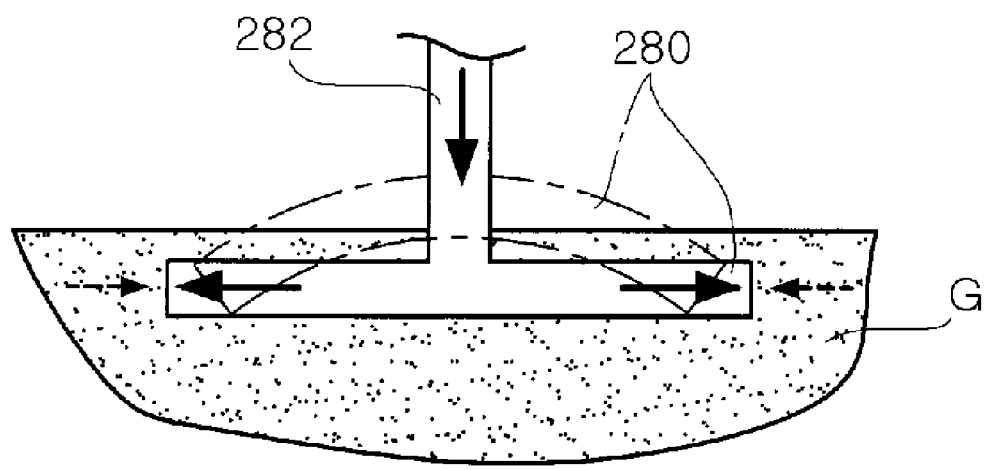

[Fig. 16]
(a) 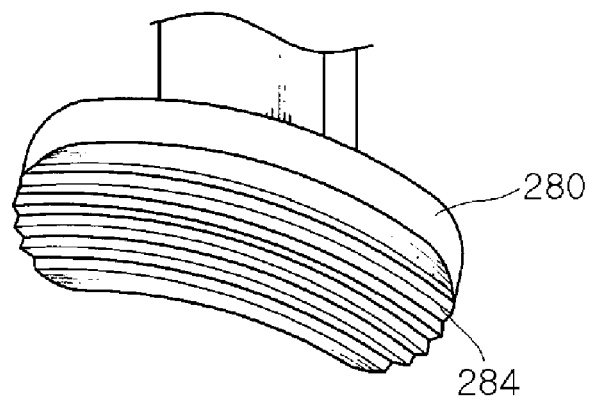
(b) 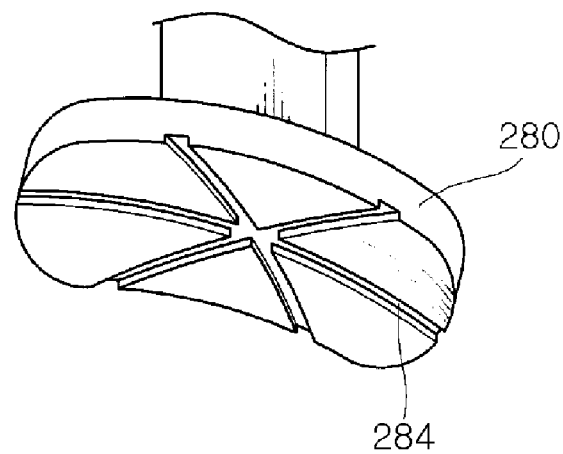
(c) 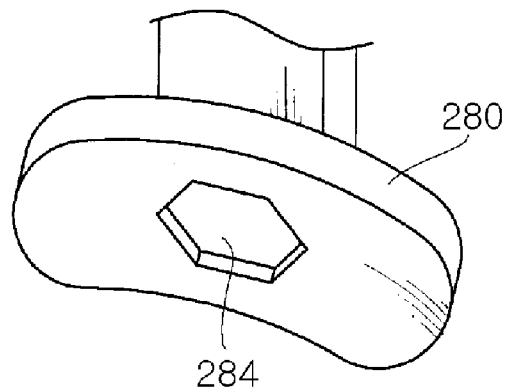

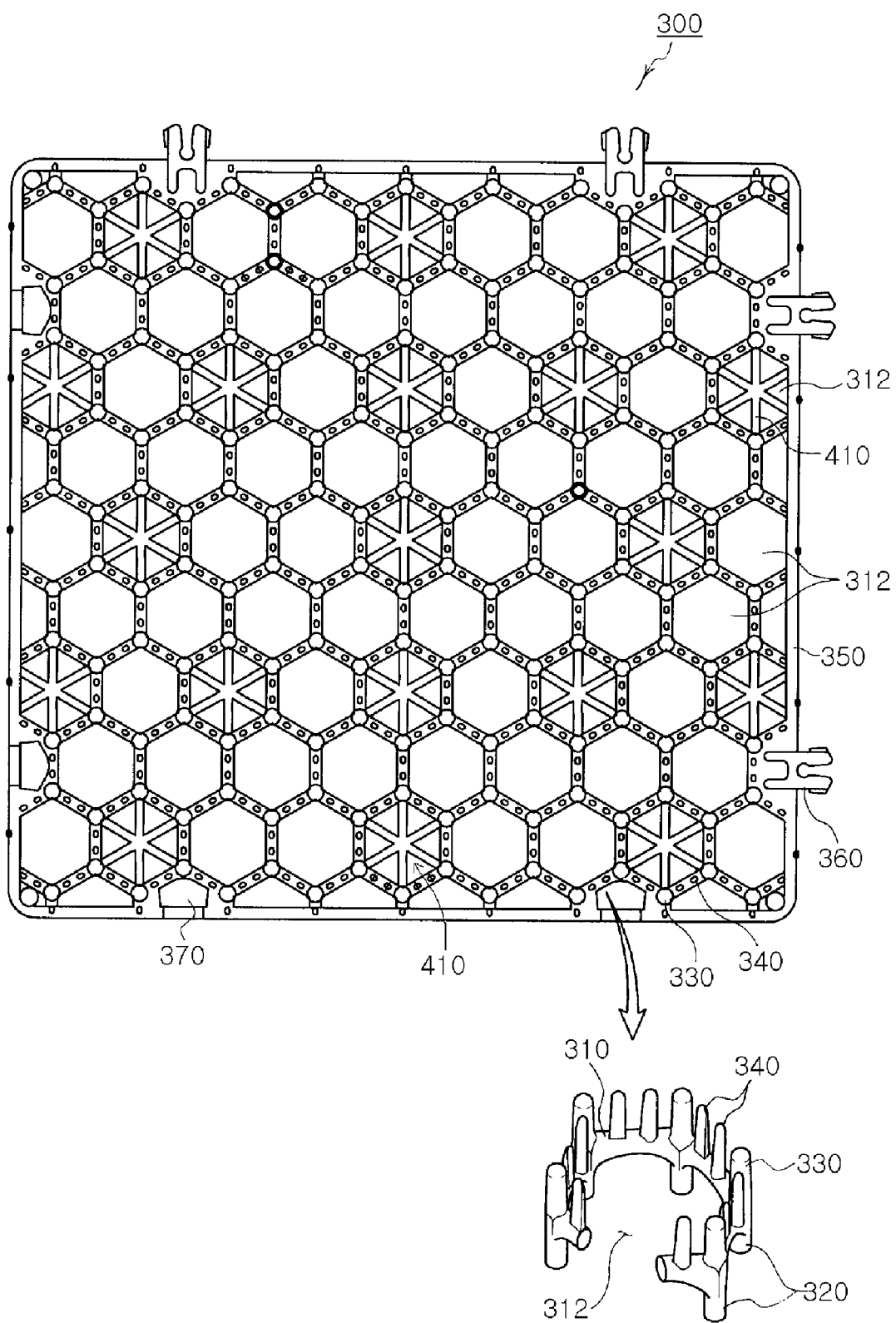
[Fig. 17]

[Fig. 18]
(a)
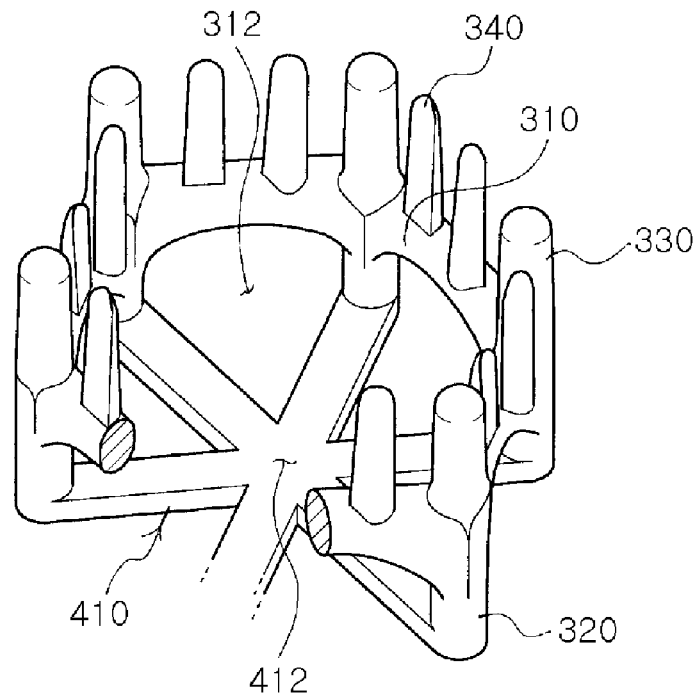
(b)
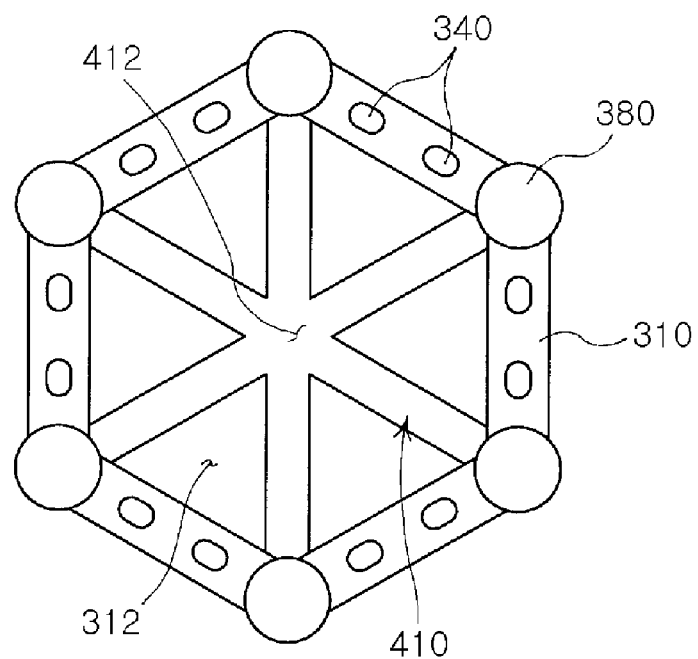

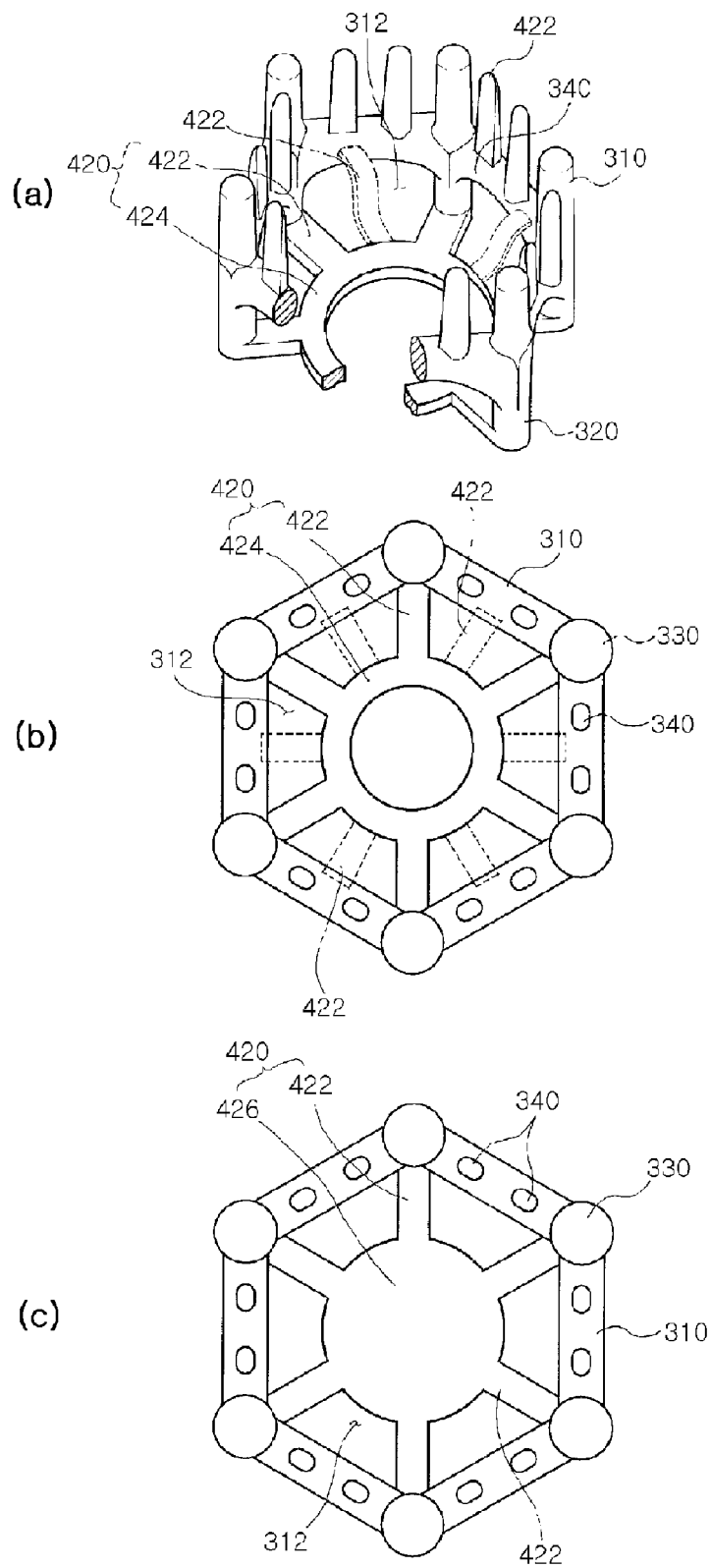
[Fig. 19]

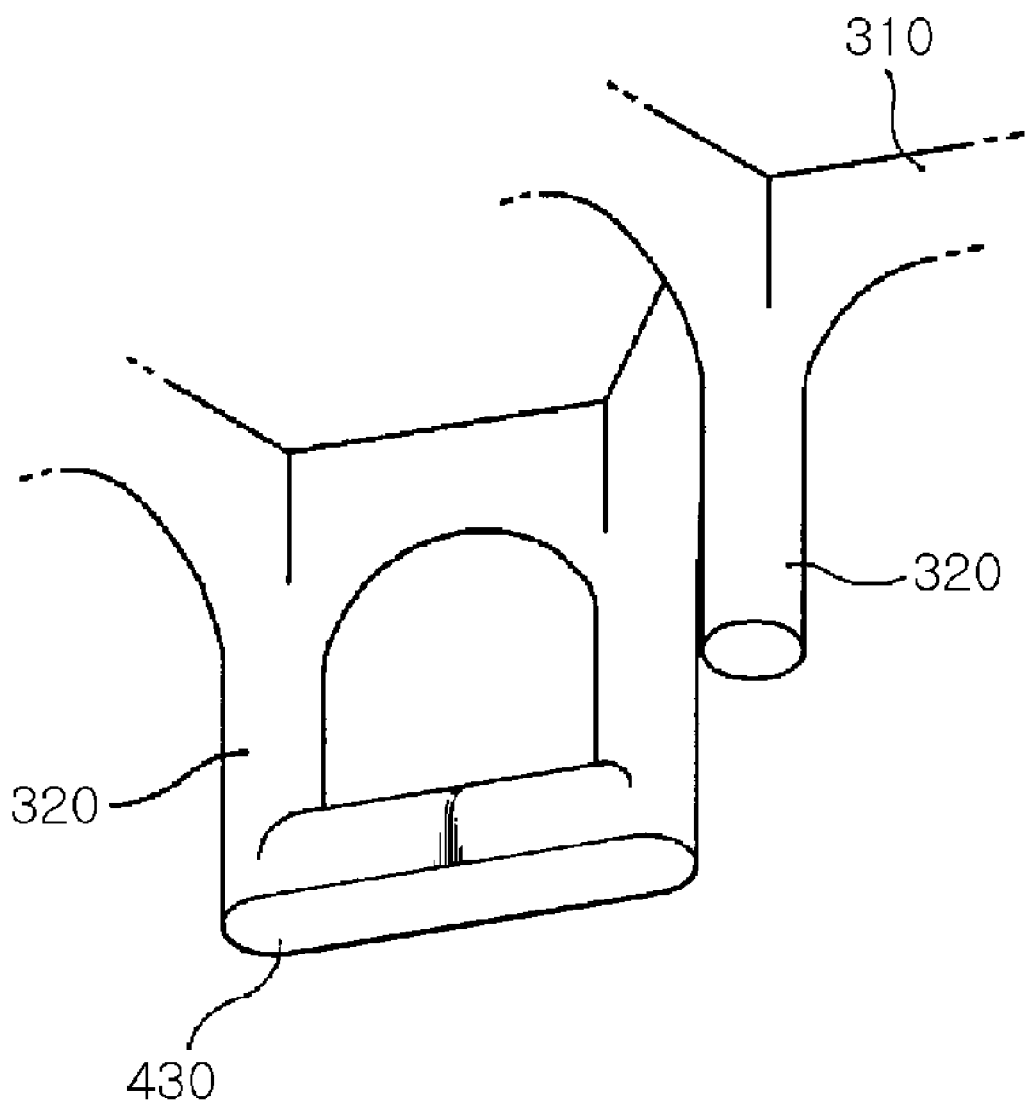
[Fig. 20]

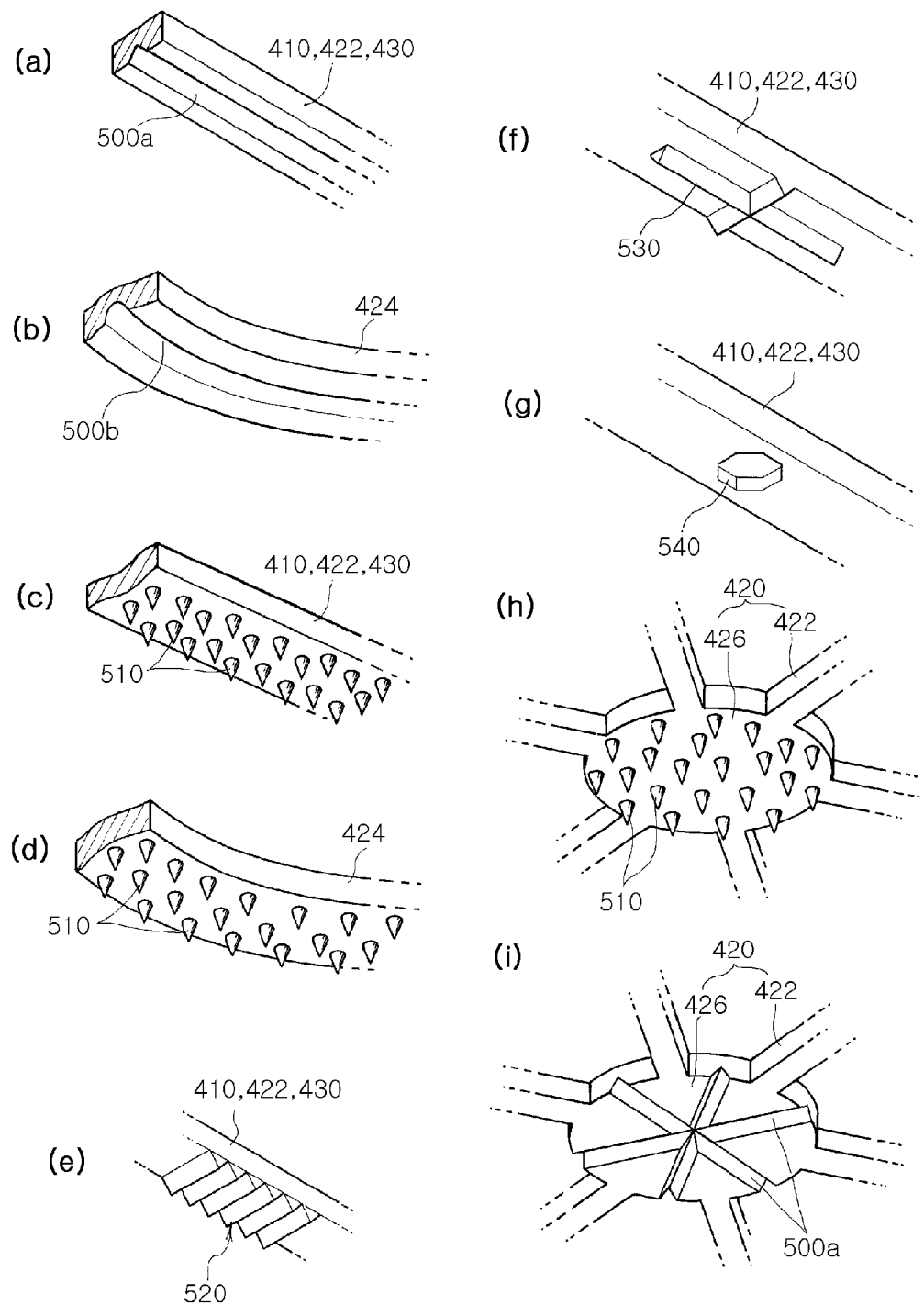
[Fig. 21]

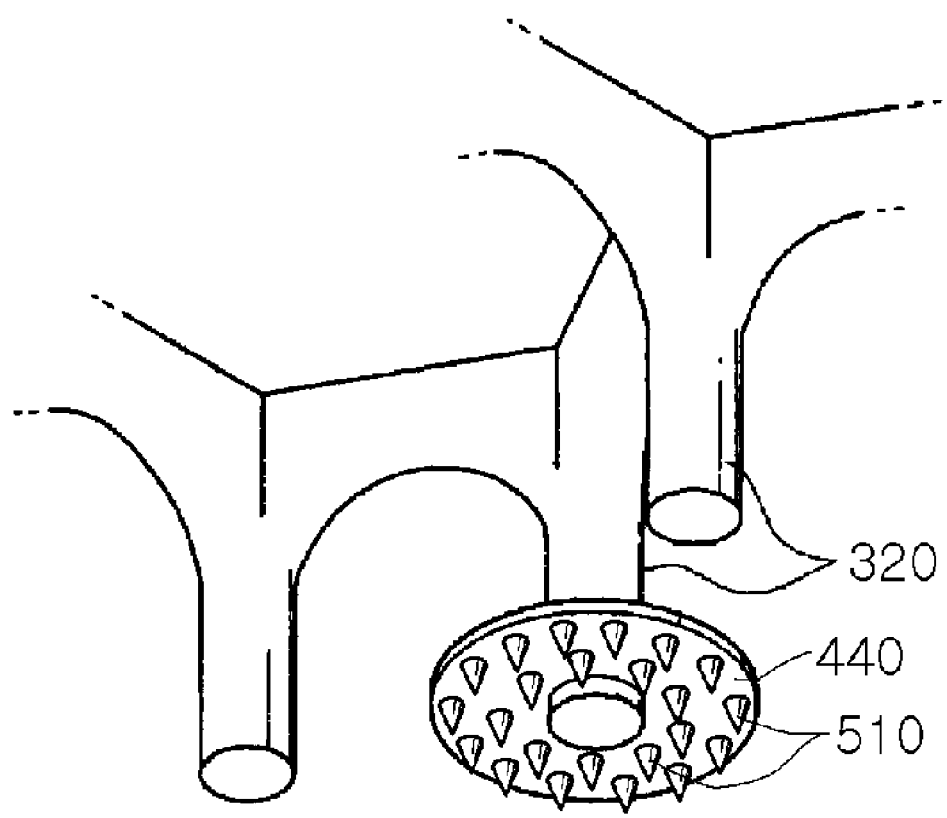
[Fig. 22]

[Fig. 23]
(a)
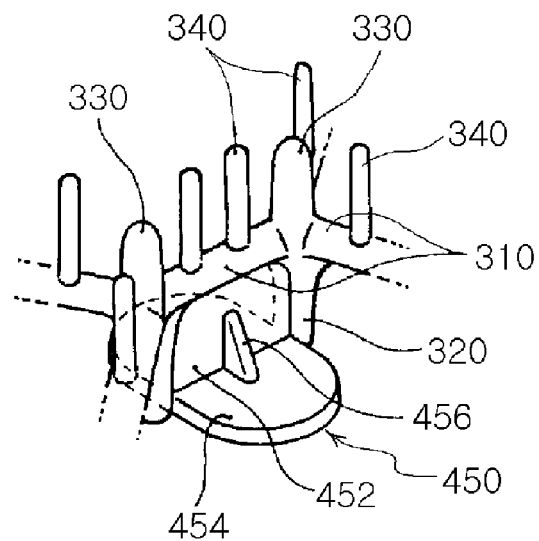
(b)
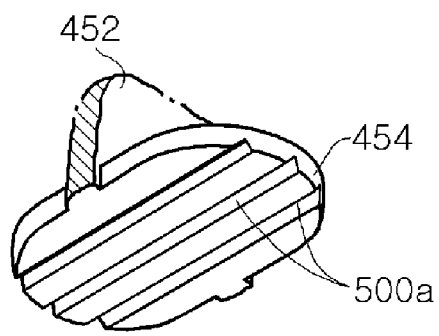
(c)
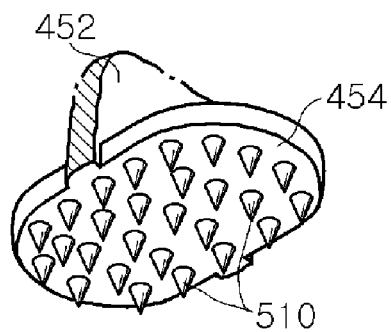

[Fig. 24]
(a)
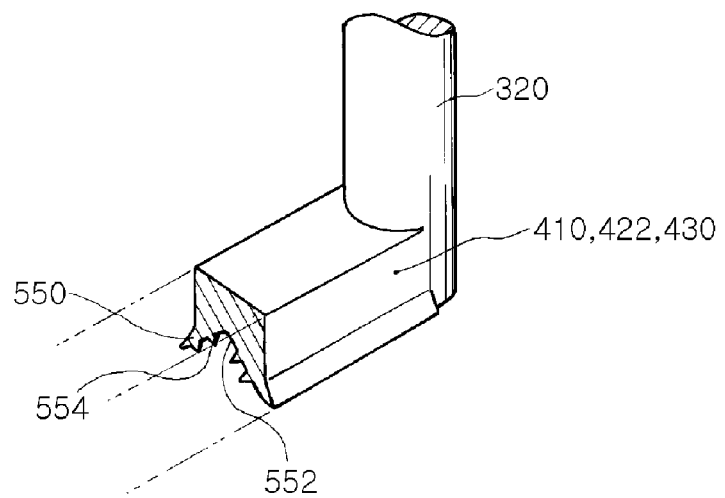
(b)
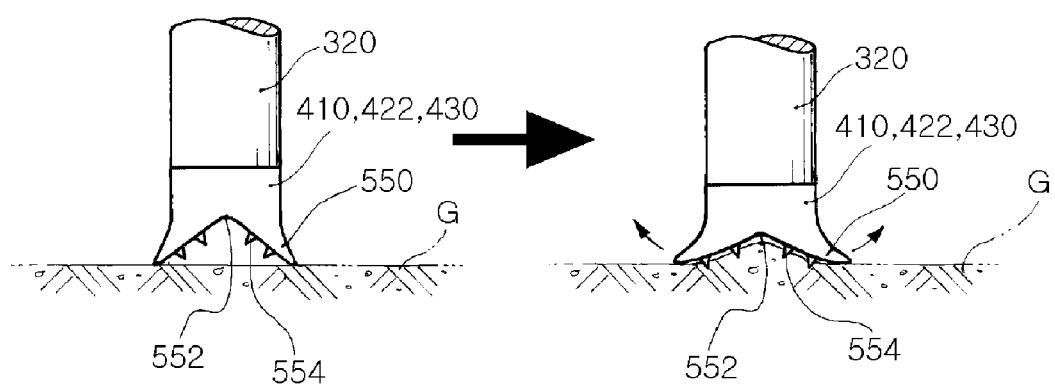

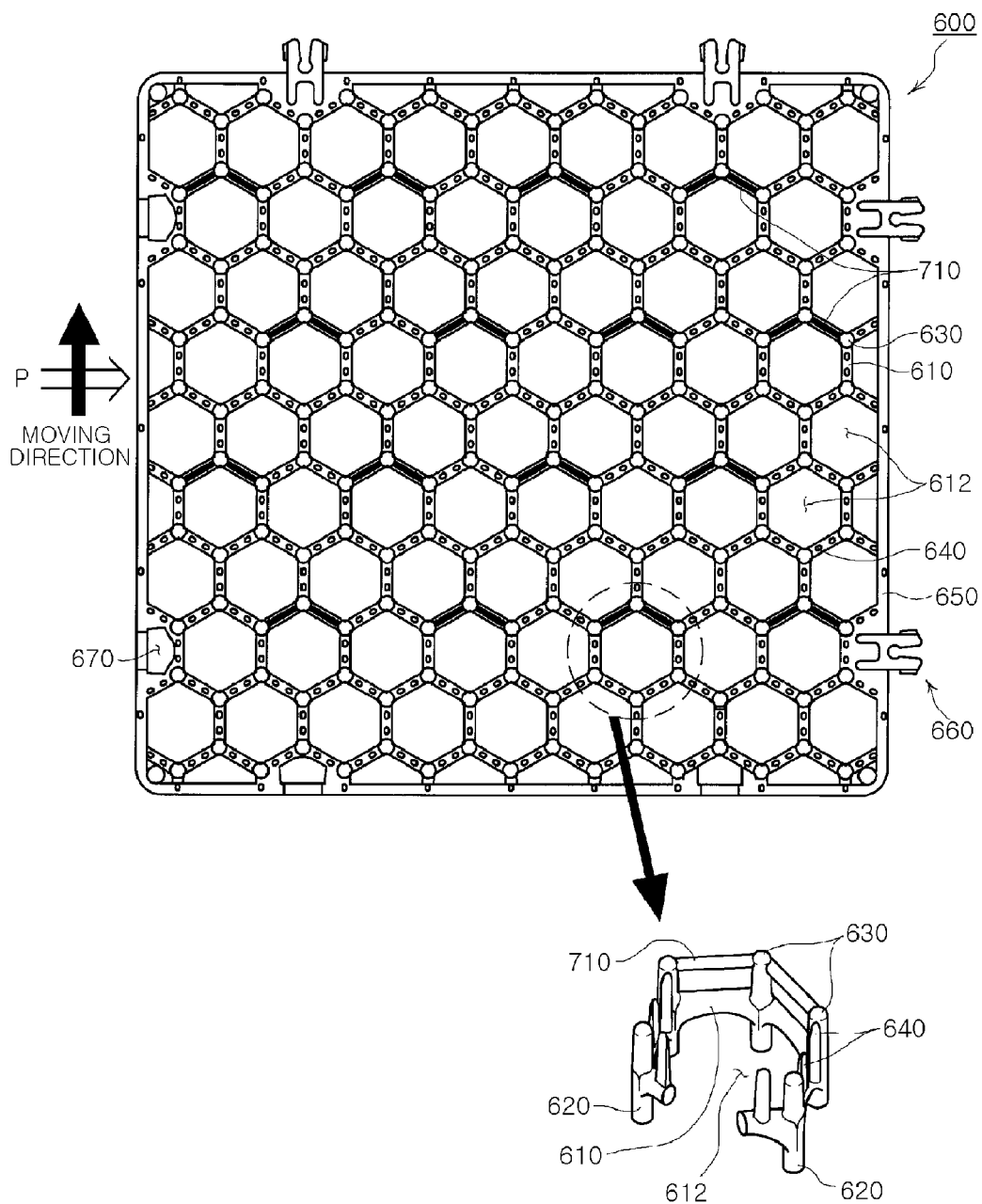
[Fig. 25]

[Fig. 26]
(a)
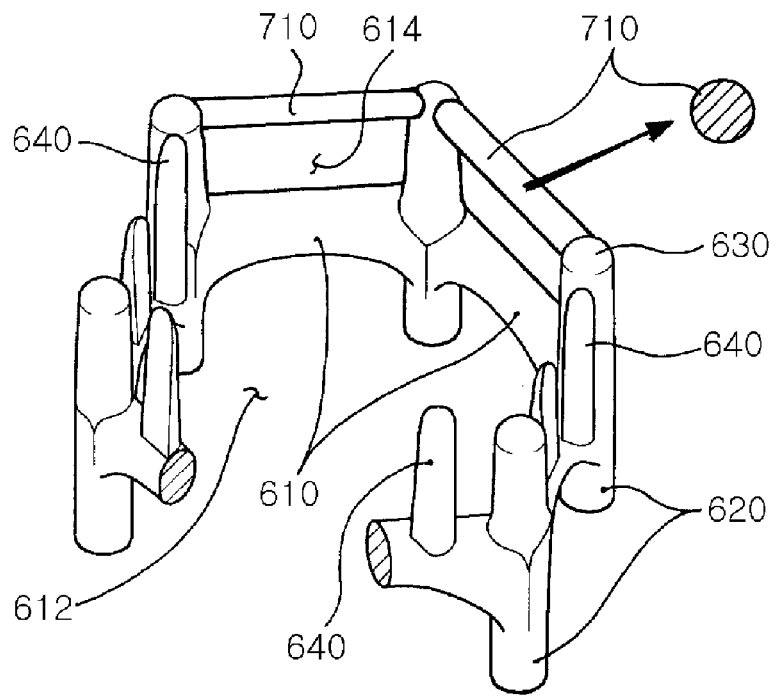
(b)
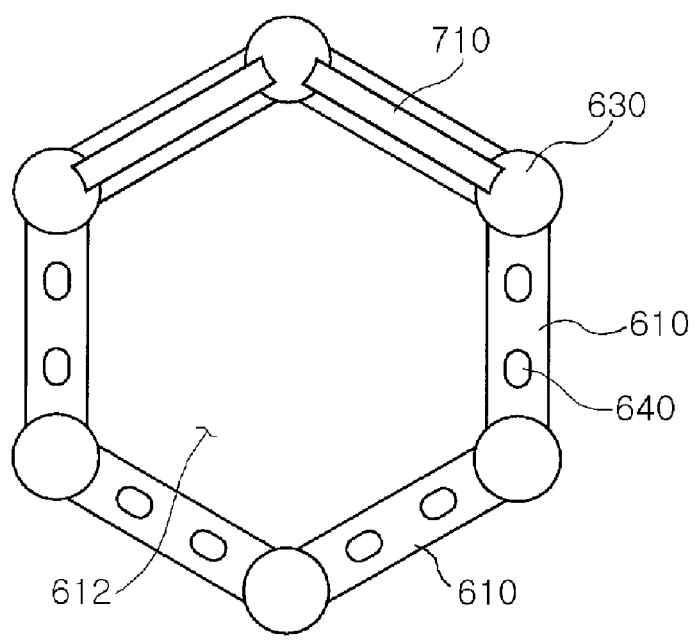

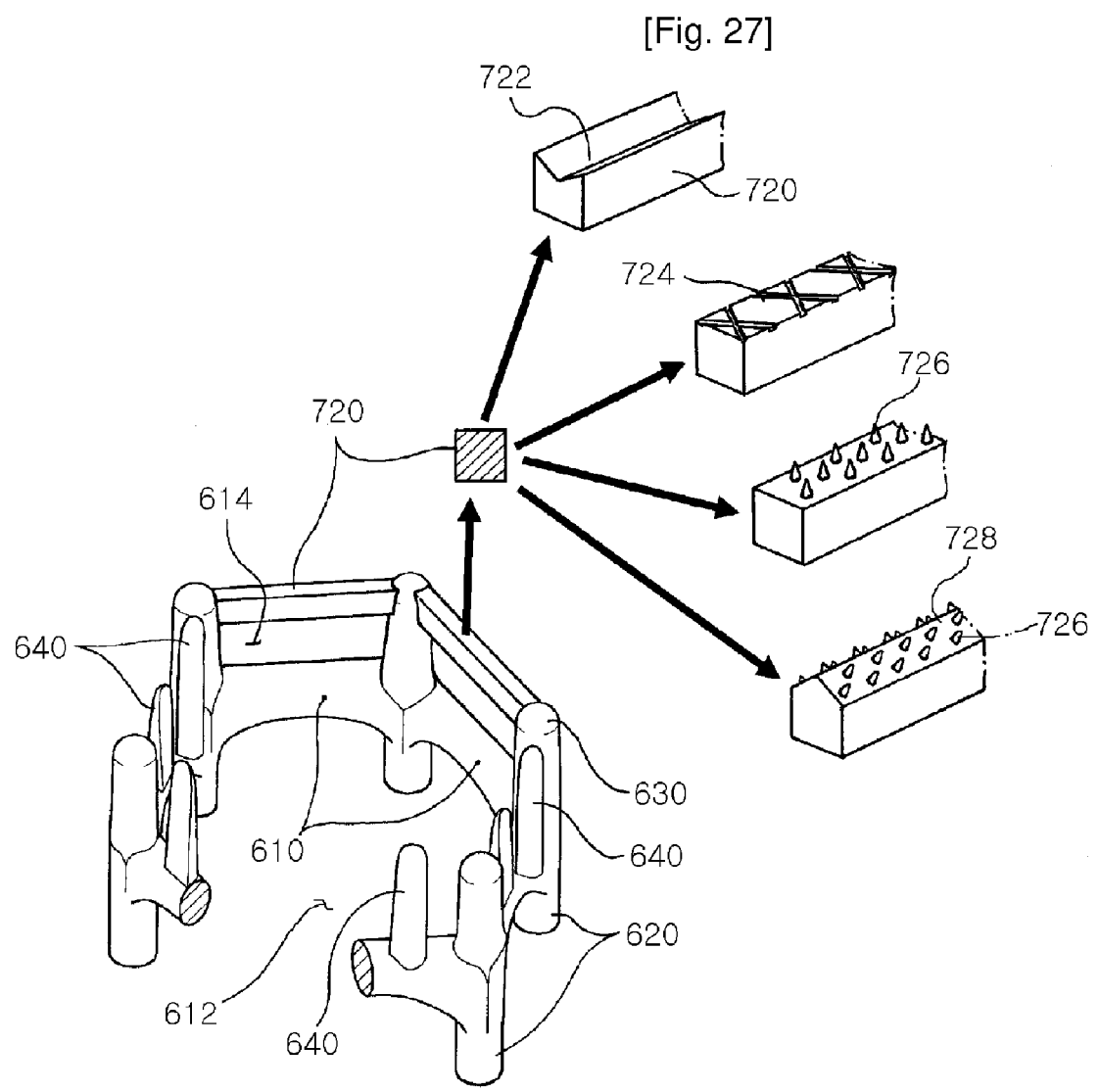
[Fig. 27]

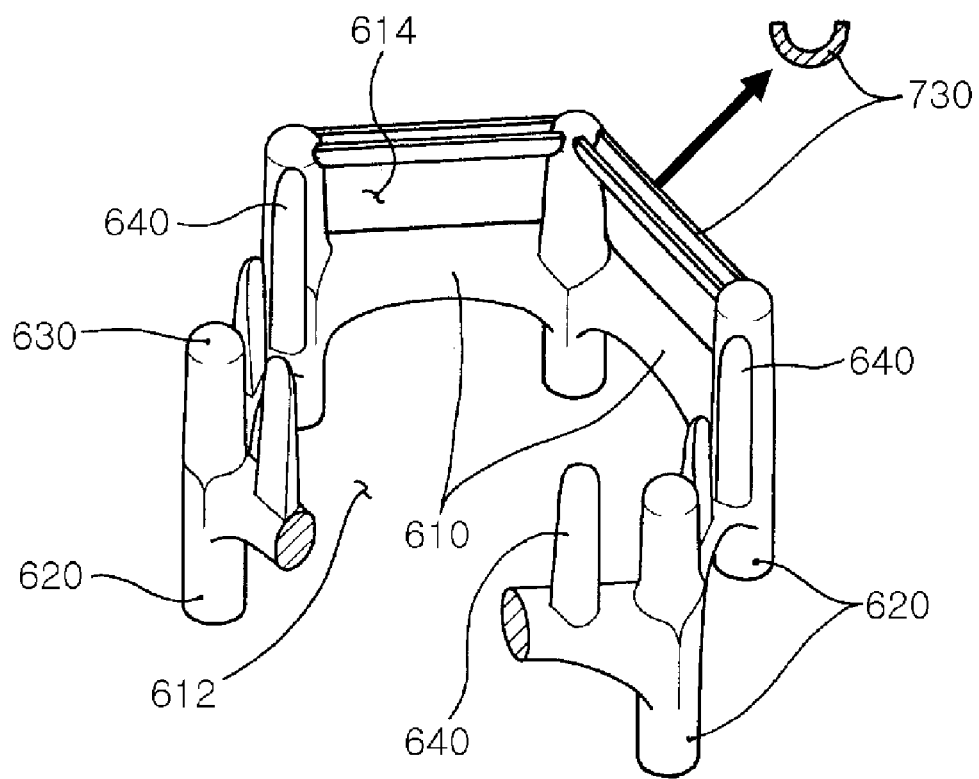
[Fig. 28]

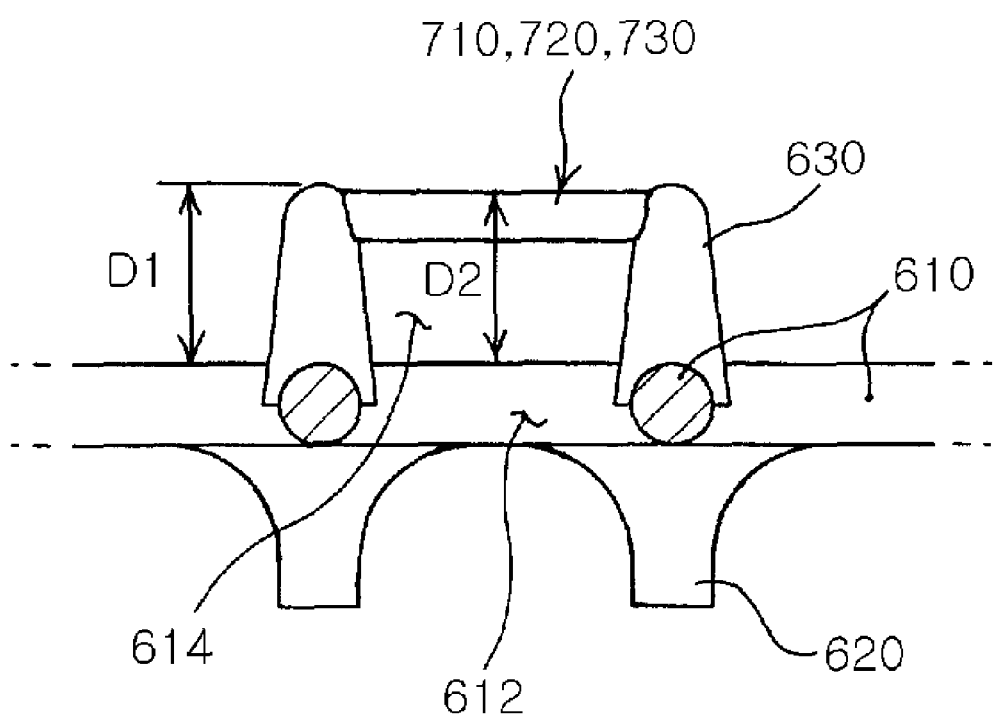
[Fig. 29]

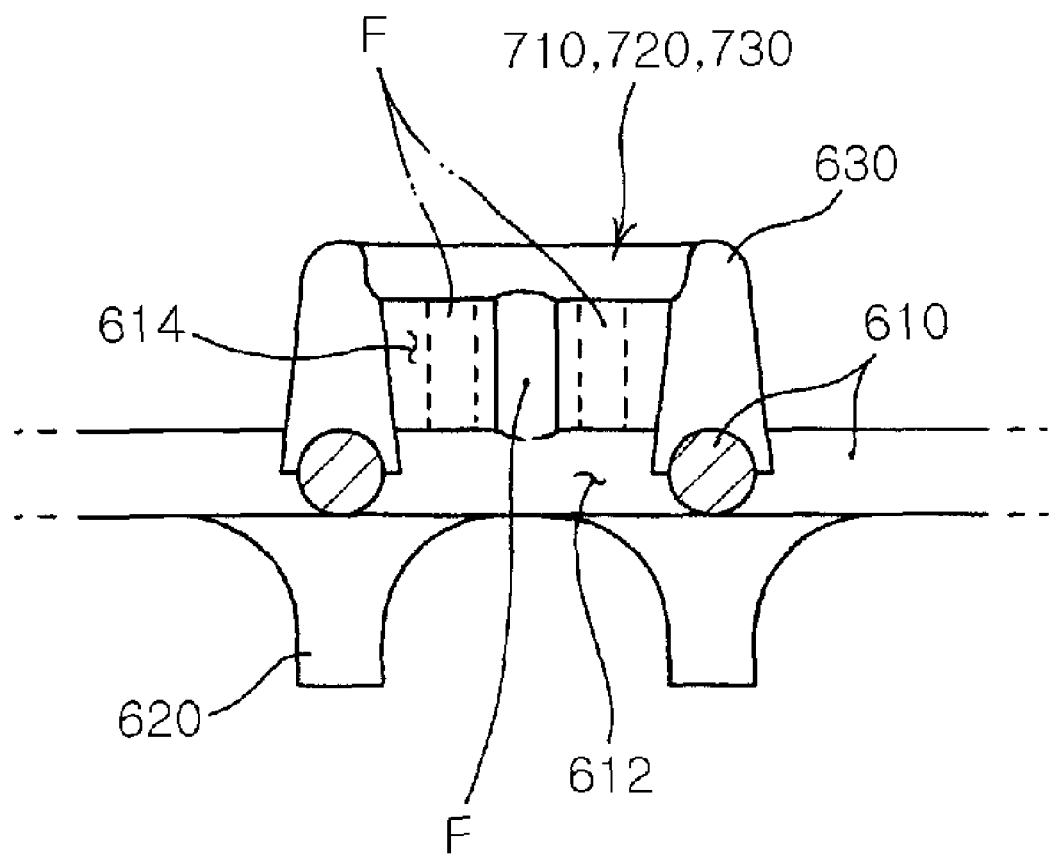
[Fig. 30]

[Fig. 31]
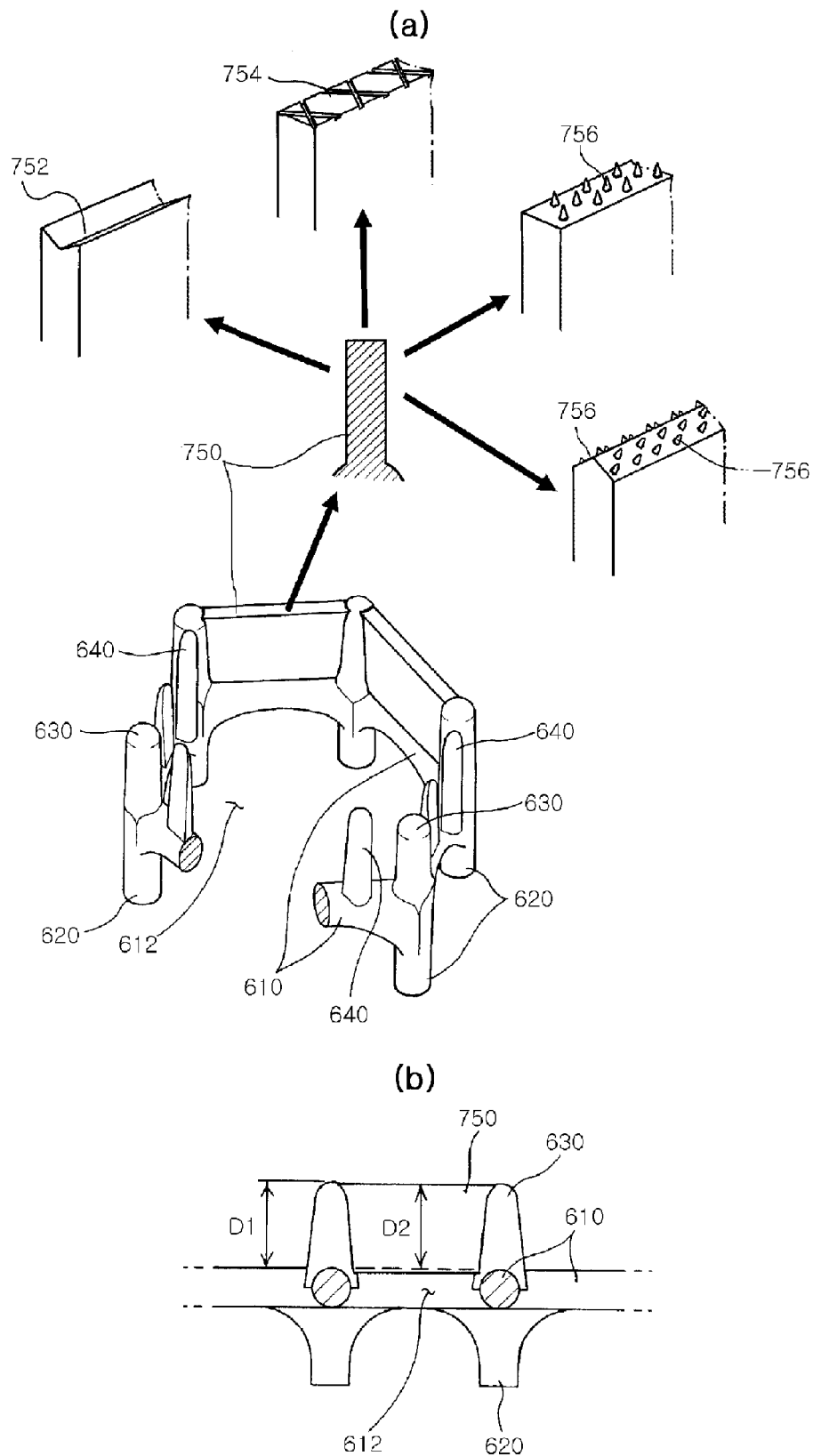

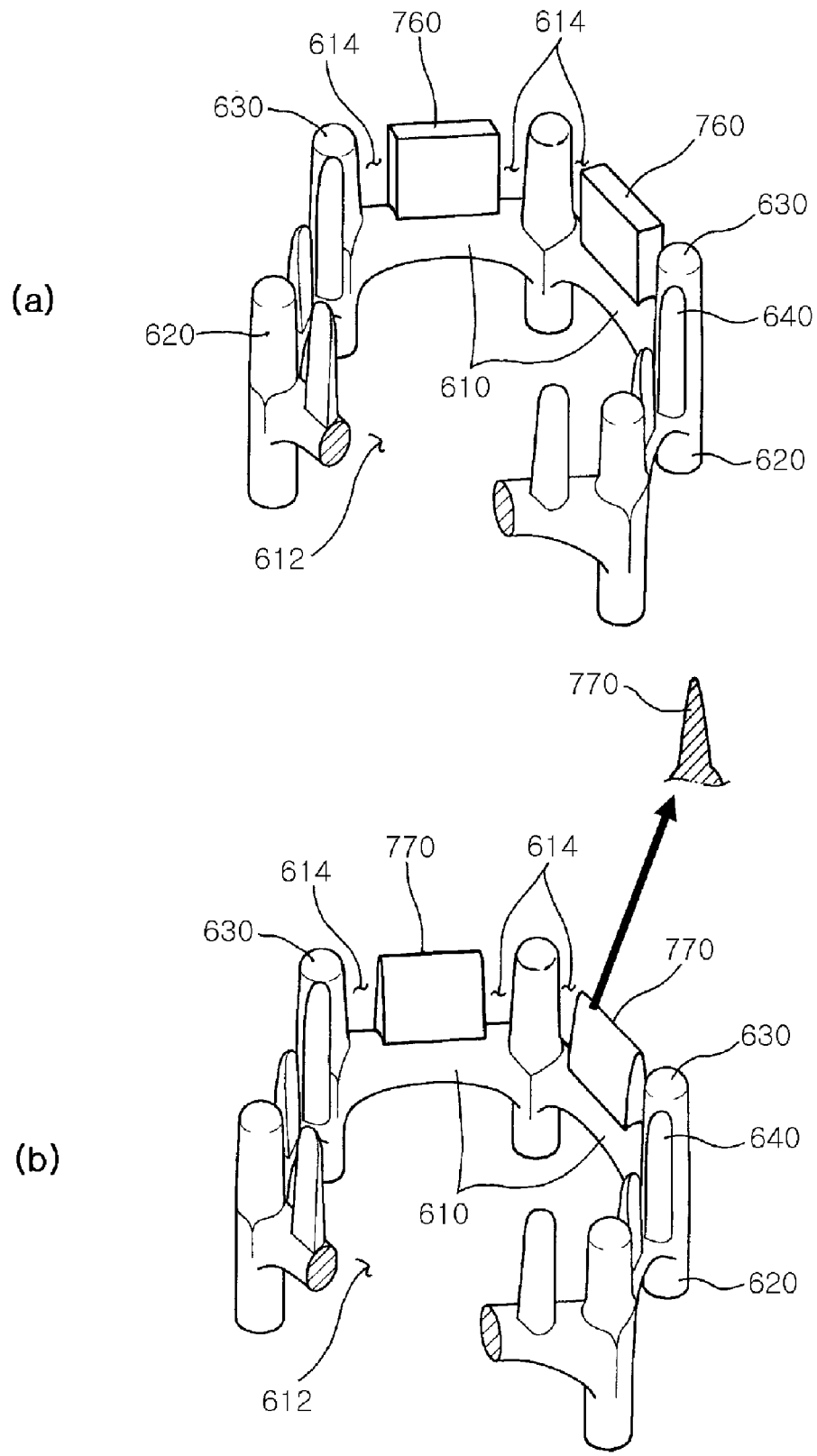
[Fig. 32]

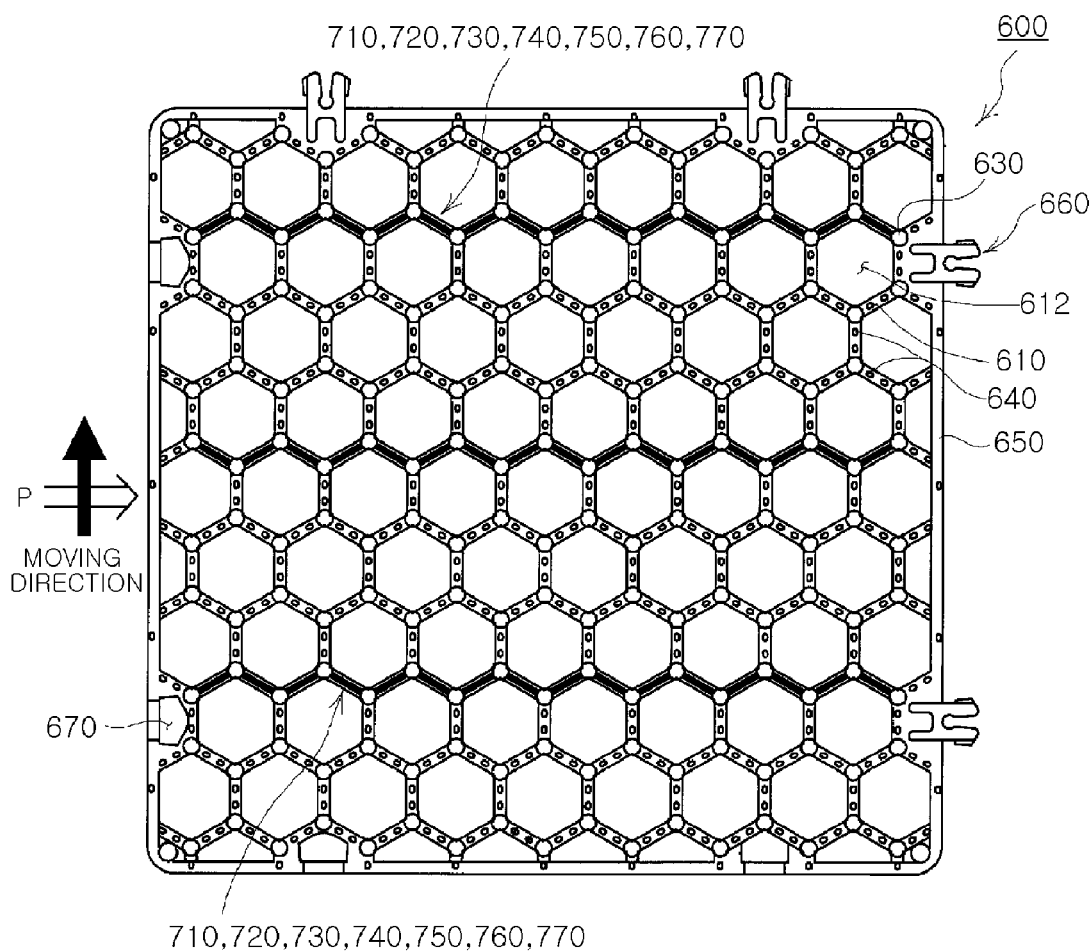

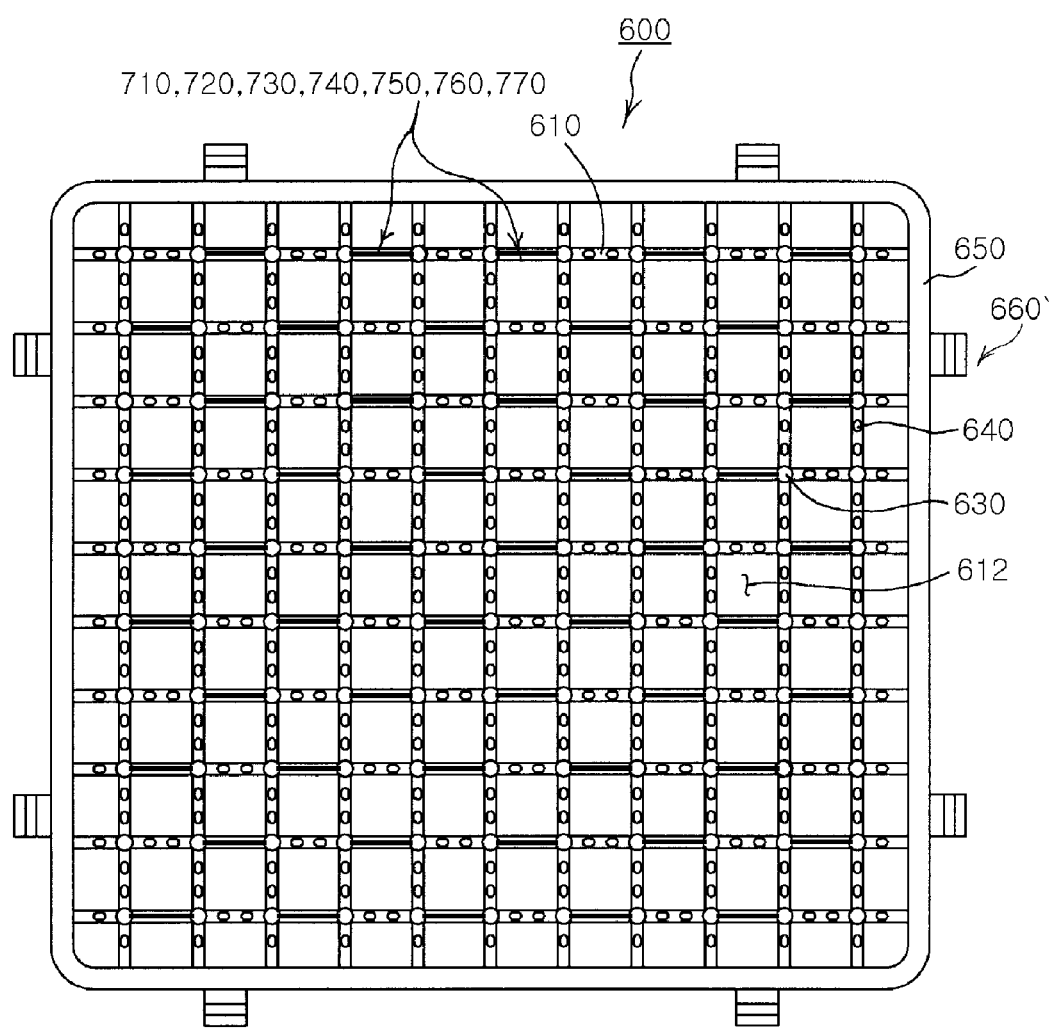
[Fig. 34]

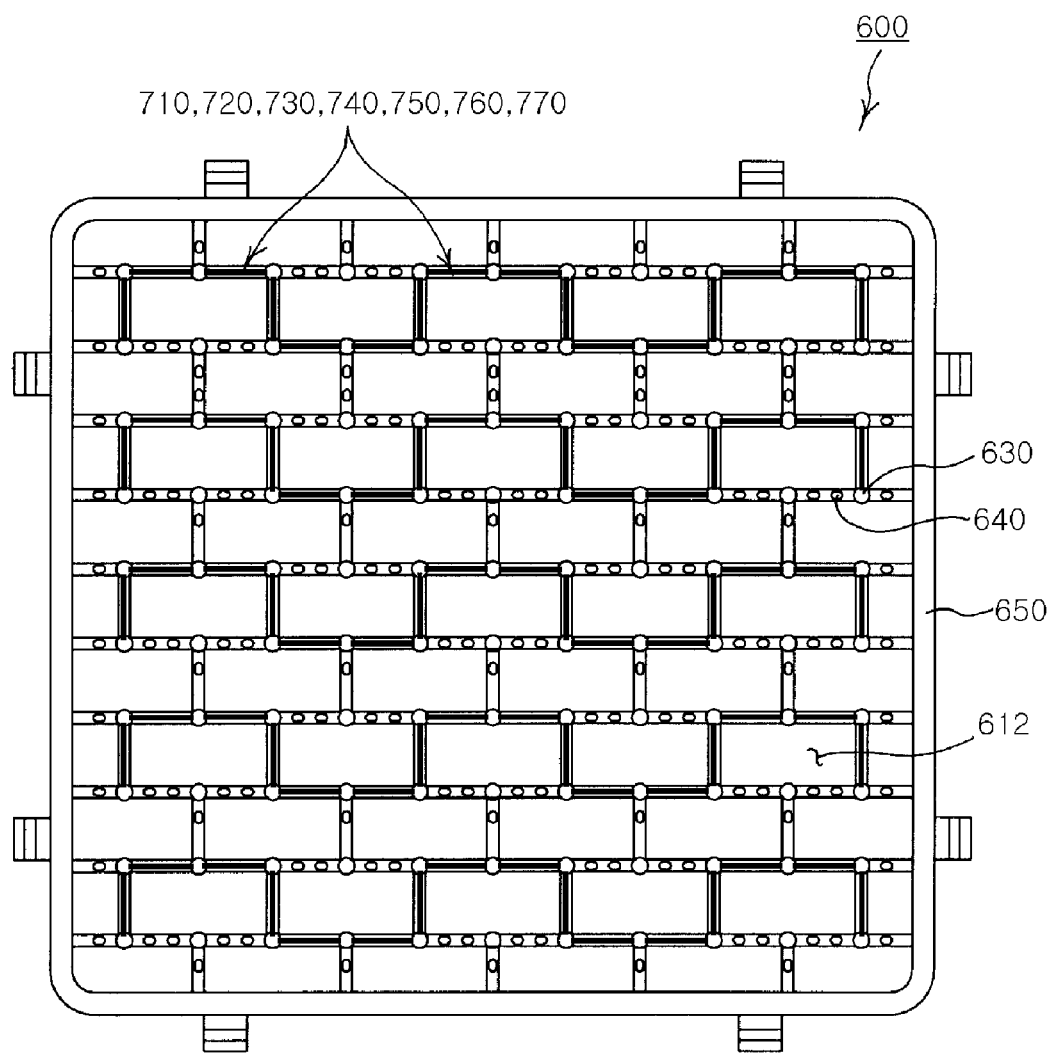
[Fig. 35]

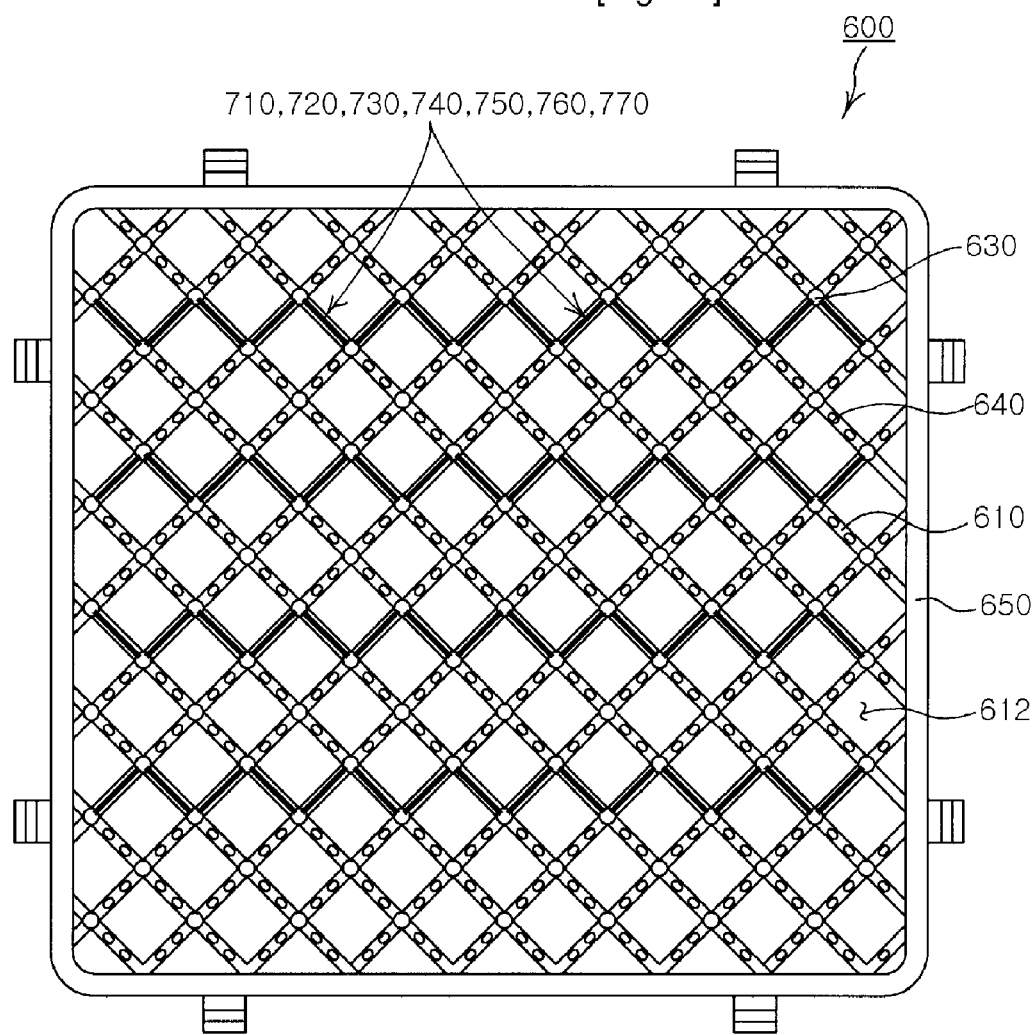

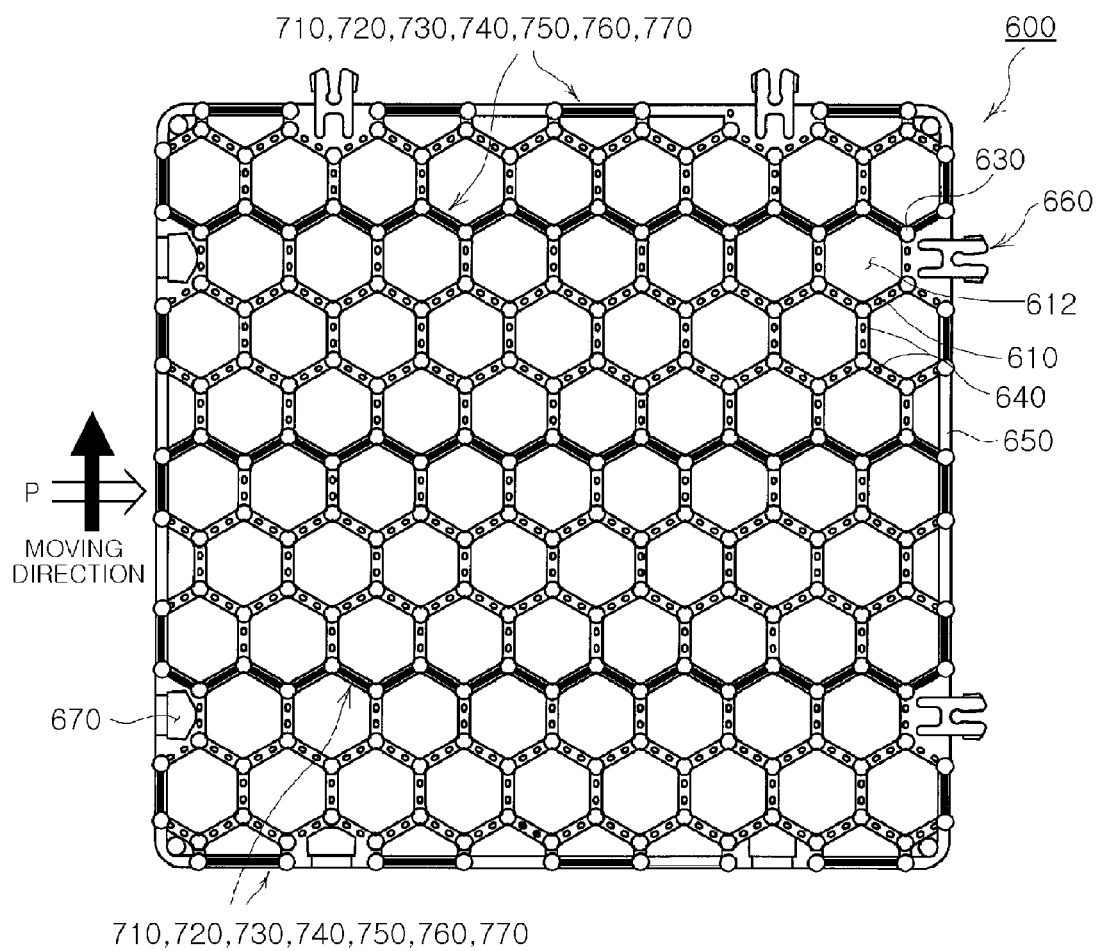

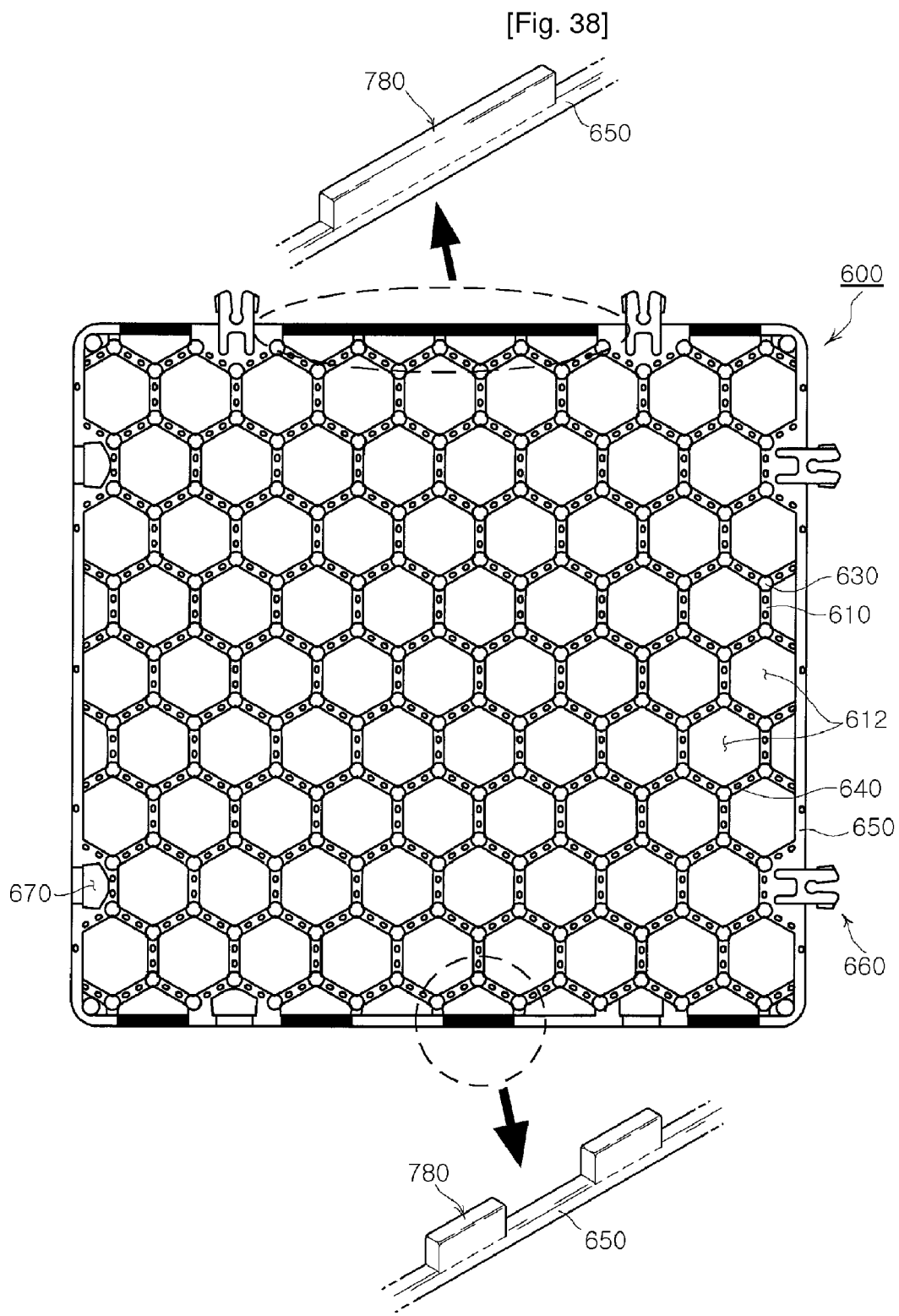
[Fig. 38]

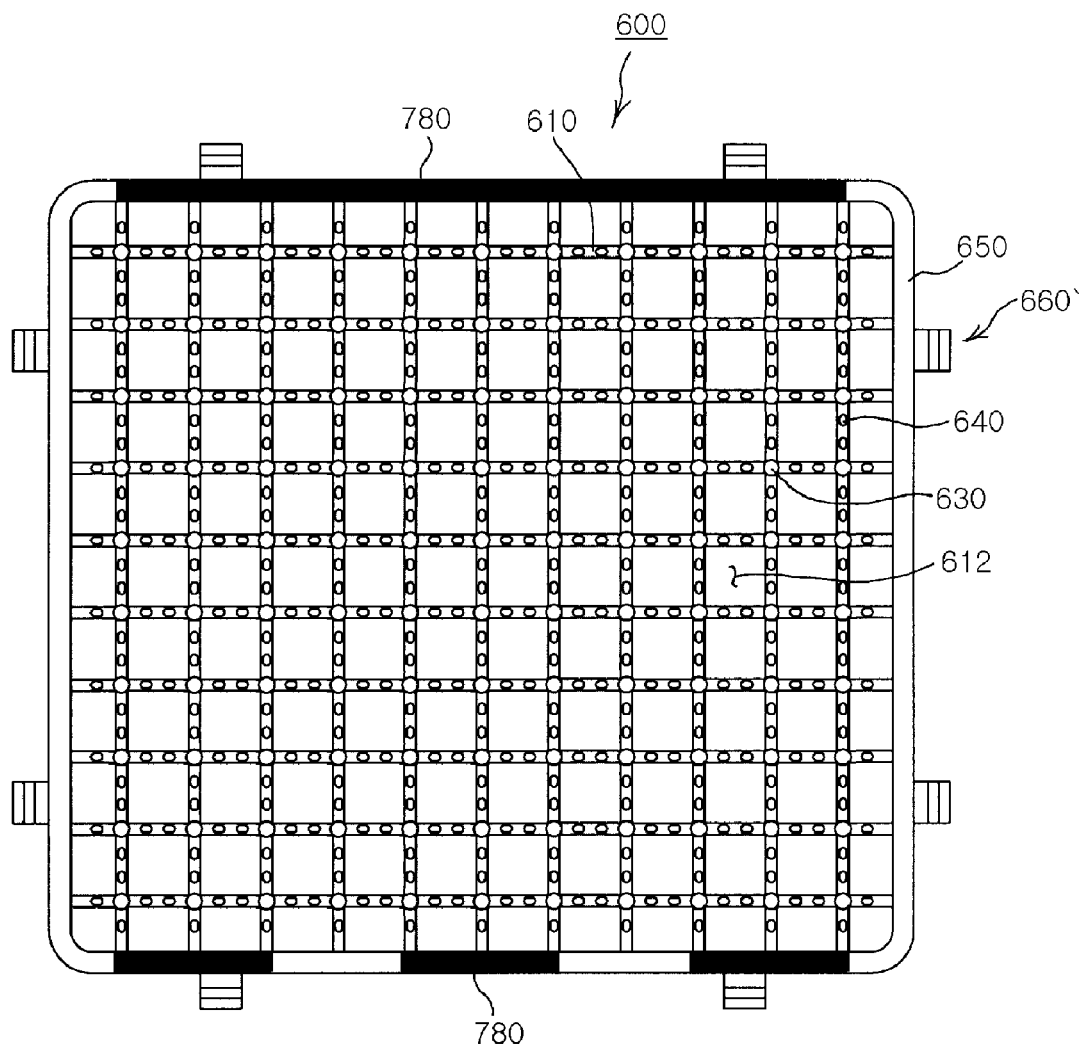
[Fig. 39]

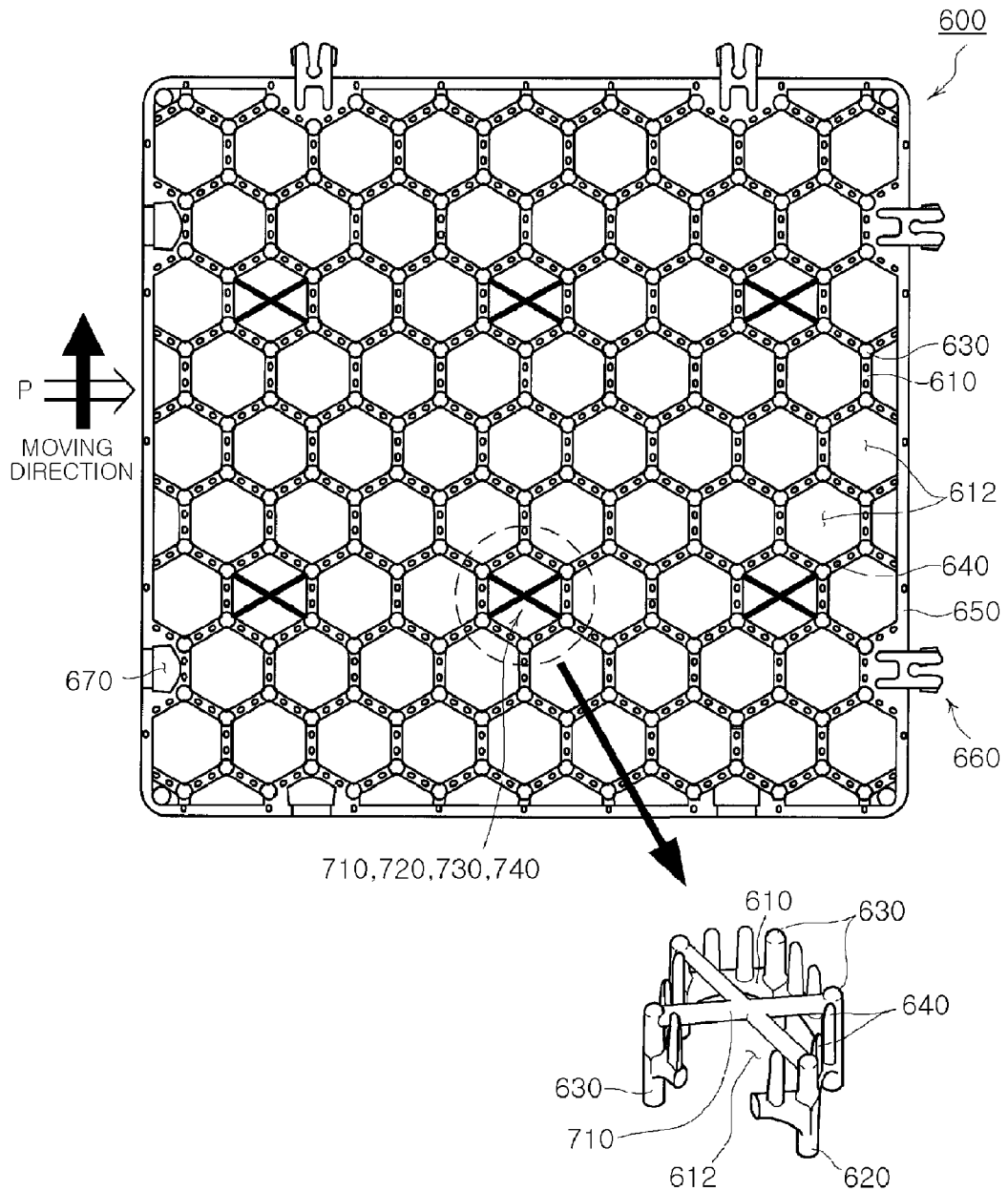
[Fig. 40]

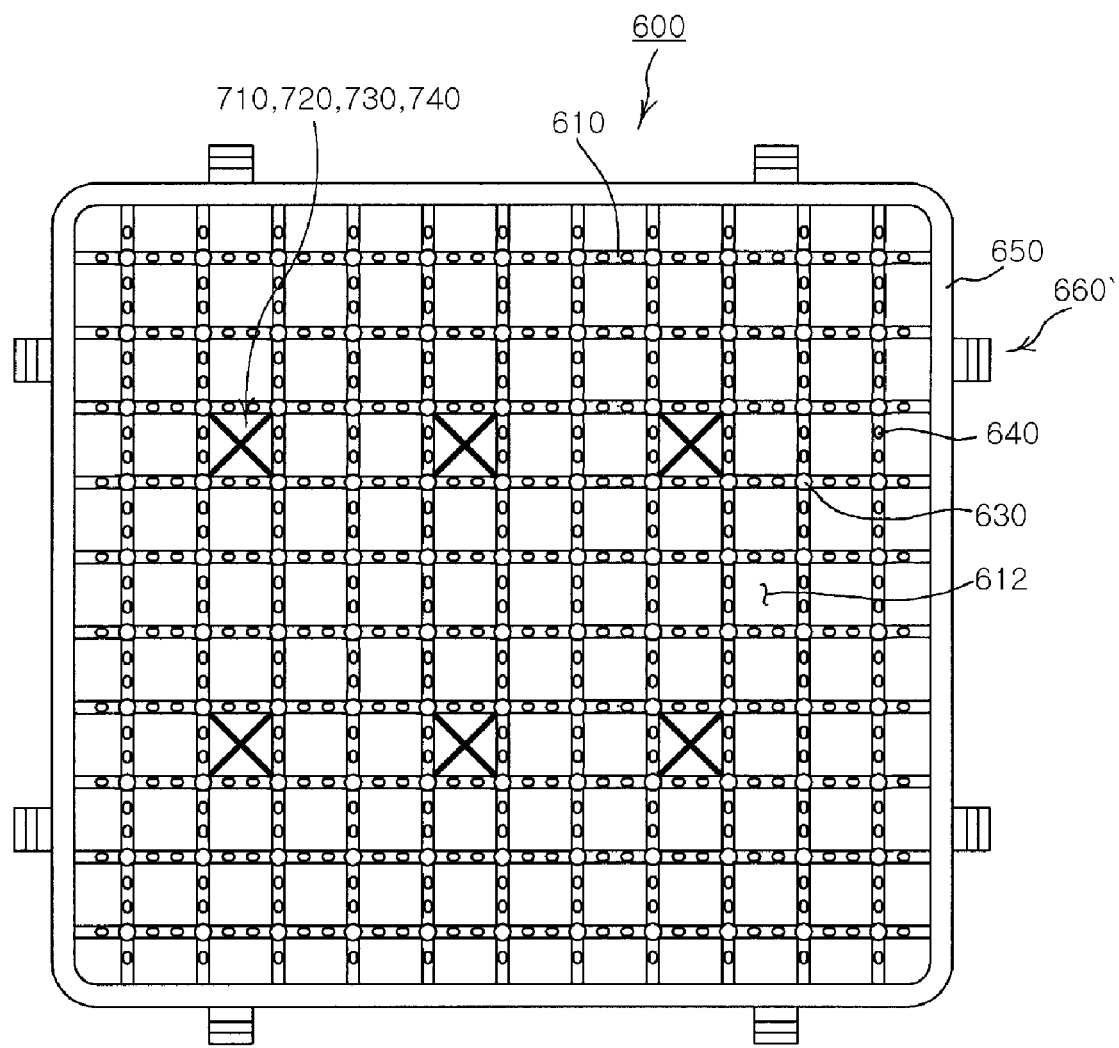
[Fig. 41]

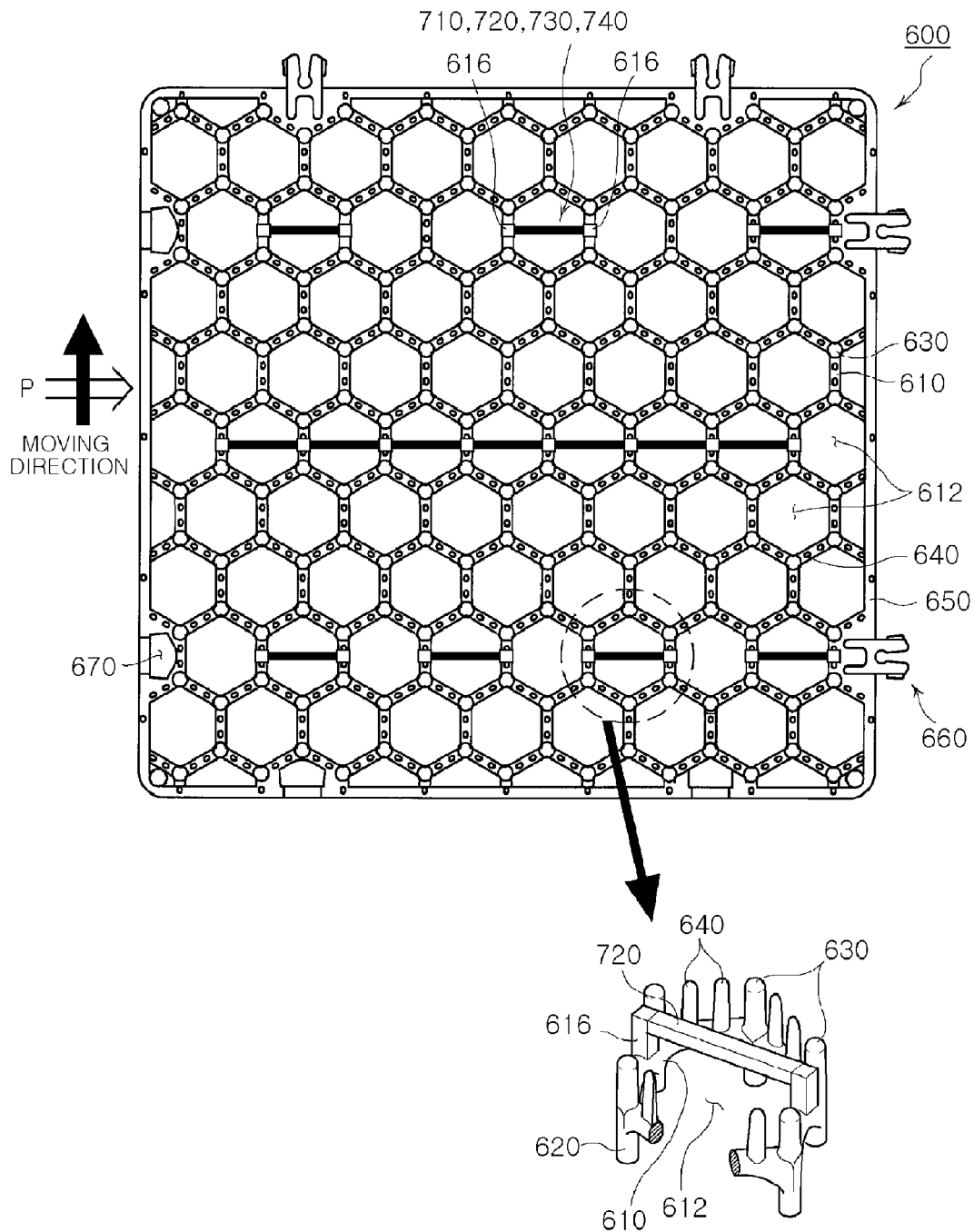
[Fig. 42]

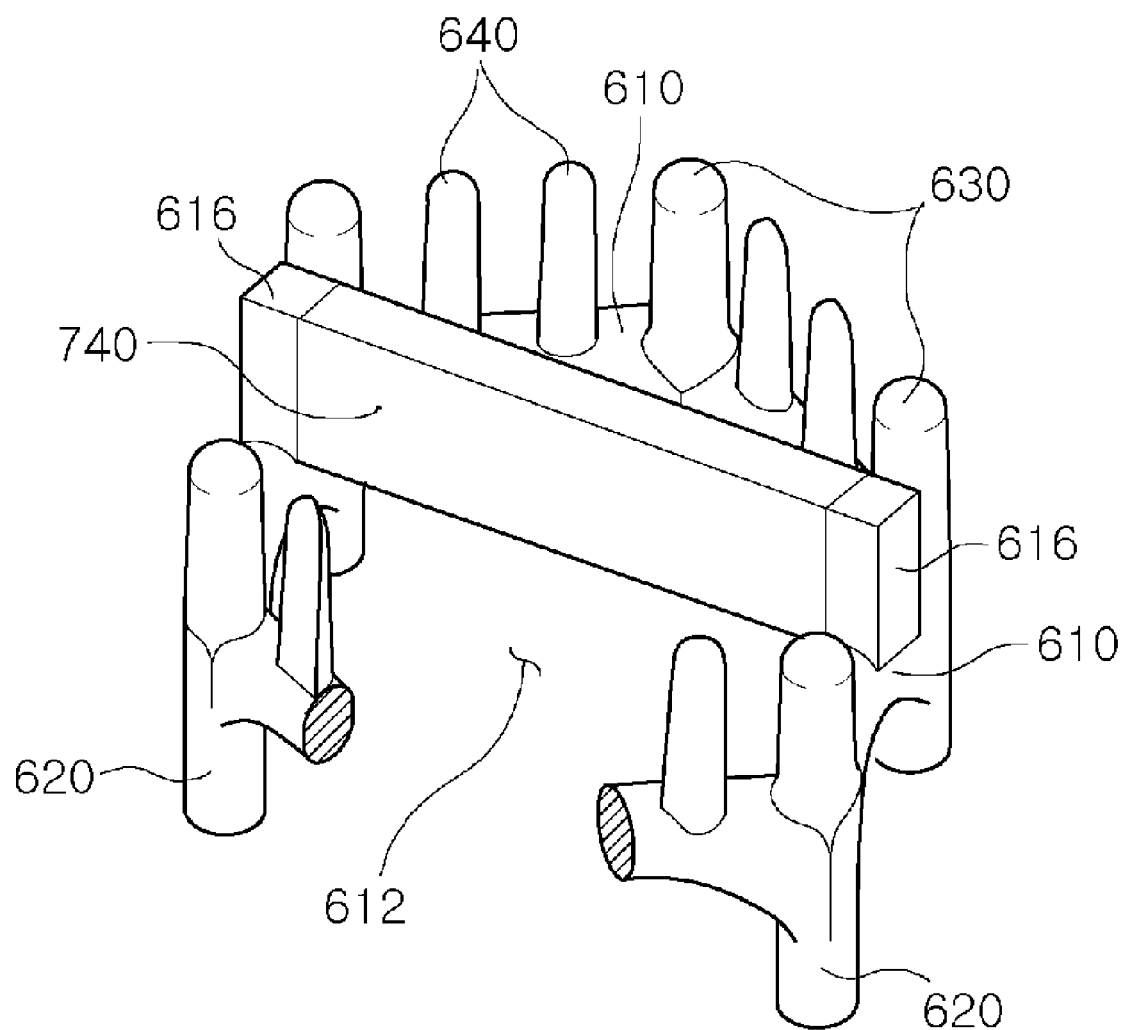

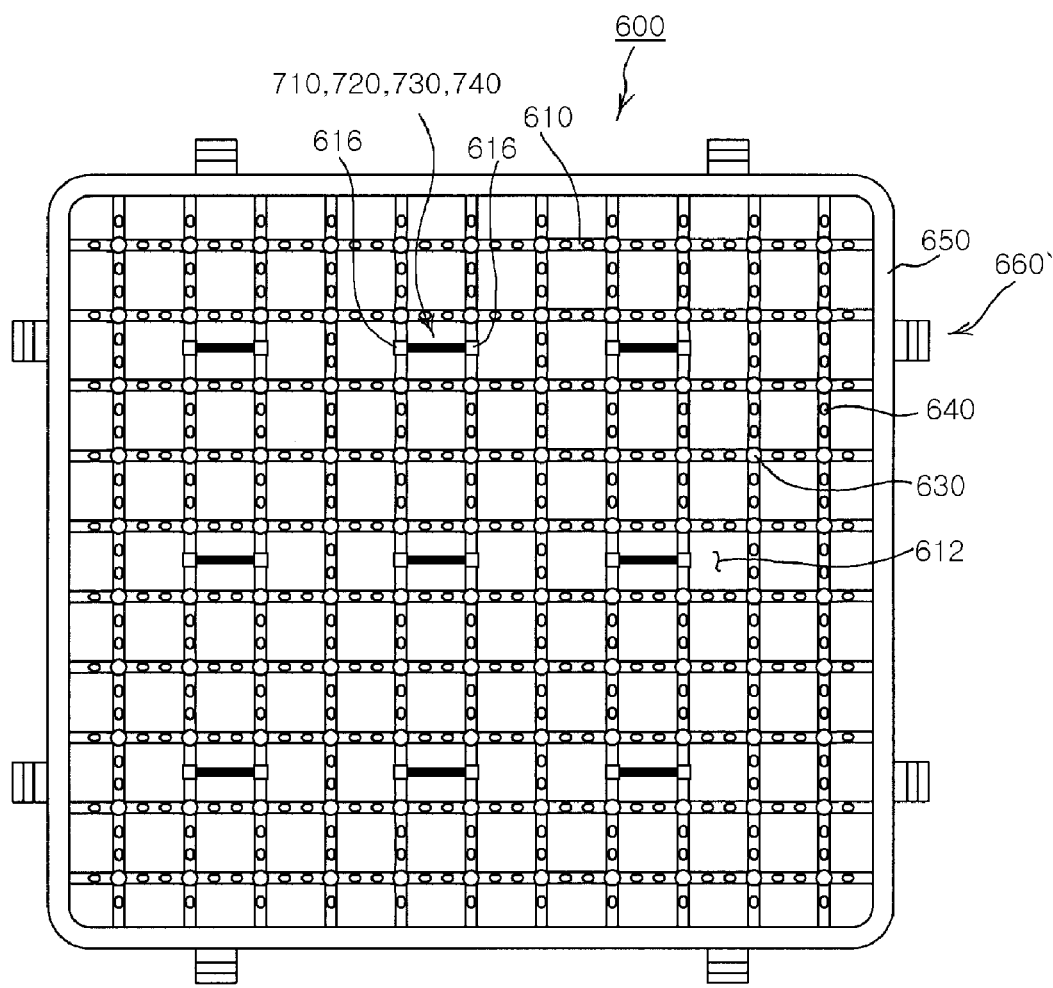
[Fig. 44]

[Fig. 45]
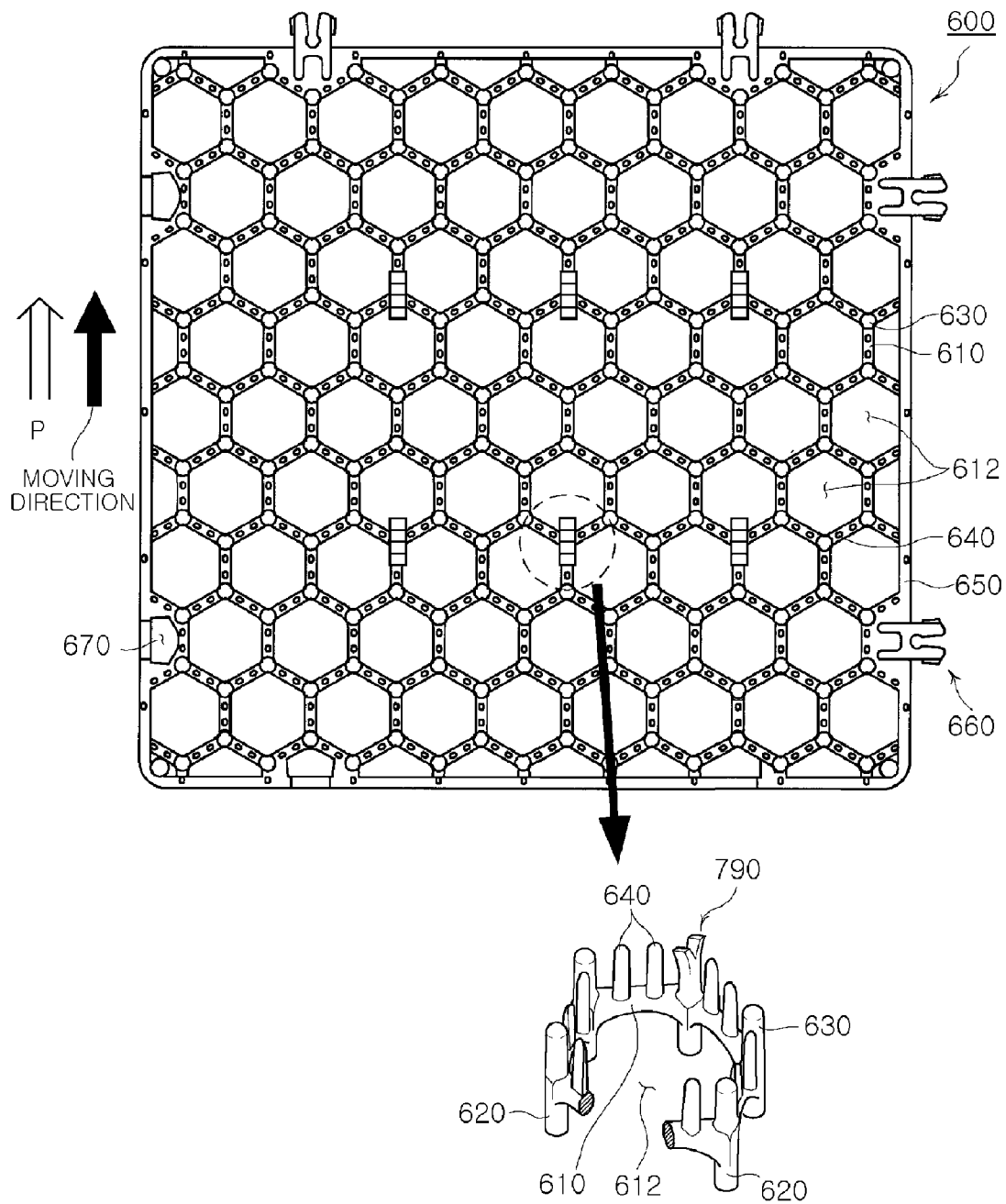

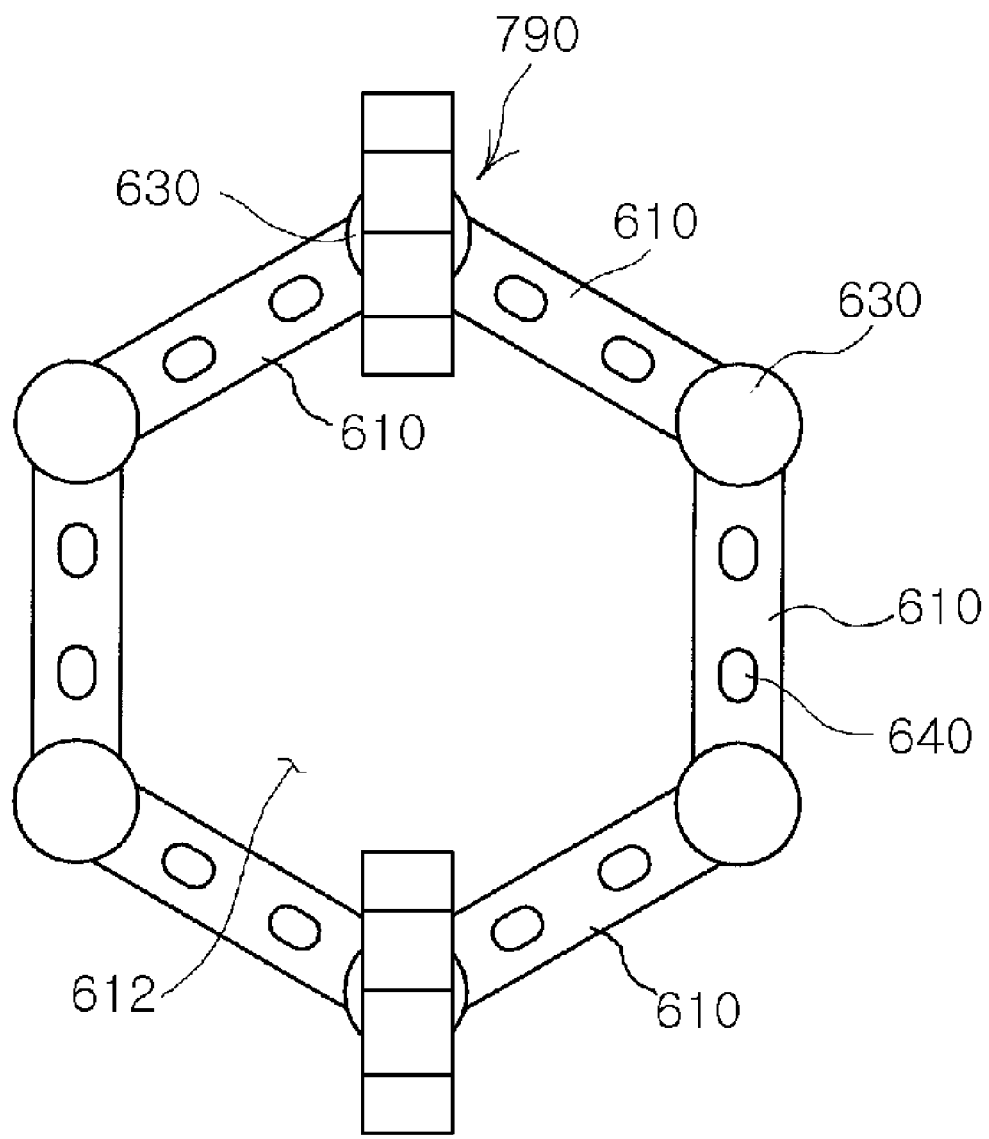
[Fig. 46]

GRASS PROTECTION MAT

This application is a national phase of International Application No. PCT/WO2008/023964 filed Aug. 24, 2007 and published in the English language.

TECHNICAL FIELD

The present invention relates to a grass protection mat capable of protecting grass in a golf course, a grass field, and a park lawn or being used to grow the grass, and more particularly, to a grass protection mat which prevents the mat from sinking into a ground after construction thereof, enhances sinking prevention effect by elastically deforming sinking prevention means under an applied load, restrains the mat from sliding by mat slipping prevention means provided to the sinking prevention means, and effectively prevents persons from sliding on the mat.

BACKGROUND ART

In a grass growing place such as a golf course, a grass fields, and a park lawn, grass in a moving area where a person or a vehicle, for example, a cart of the golf courses frequently moves is consistently pressed down and easily damaged. Therefore, a considerable cost is required to repair the damaged grass.

Accordingly, in order to prevent the grass from being damaged in the moving area where the person or the vehicle frequently moves in the grass growing place, the grass protection mat for preventing the grass from being damaged by supporting and buffering the load of the person or vehicle is constructed.

Even though not shown in the drawings, a generally known conventional grass protection mat includes body member constituting an overall structure of the mat and having spaces through which the growing grass penetrates, lug members supported on the ground, and protruding pillars for supporting the load.

The grass protection mat further includes buffer wings for dispersing and buffering the load and an outer frame for maintaining an outer frame of the mat.

In addition, hooking means and fastening openings may be provided to the outer frame of each mat. The hooking means and fastening openings of the mat are engaged with those of adjacent mats, so that the mats can be constructed in a linking construction manner.

Since the lug members and the protruding pillars support the load of the person and the vehicle passing on the mat, and the buffer wings disperse the applied load, so that the grass protection mat prevents the growing grass from being damaged.

However, this generally known conventional grass protection mat has a problem in that the grass protection mat is sunk into the ground after construction.

For example, after construction of the grass protection mat on the ground, sand may be poured over the grass to protect the grass, or the ground becomes soft by humidity in the rainy season. In this case, the mat is easily sunk into the ground.

In addition, if the person or the vehicle consistently passes on the mat, the mat is continually pressed down to be sunk into the ground.

Due to the sinking of this grass protection mat into ground, it is difficult to protect the grass in a normal and uniform state.

For example, due to the sinking of the constructed mat into ground, the grass is grown to highly protrude from the mat. Accordingly, the load of the person or vehicle passing on the mat is directly applied to the grass, so that it is hard to protect the grass.

Furthermore, the grass protection mat has a problem in that, under or after construction, the mat may easily slide on the ground, so that the mat is hard to construct or the alignment of the constructed mat is unstable.

In addition, the grass protection mat has a problem in that the person passing on the mat slips on the mat. Specifically, in case of a mat constructed on a sloped area, the person may easily slip down to the mat.

For example, in a golf course where a teeing ground is higher than a cart road, the mat is constructed on a sloped ground between the road and the teeing ground. In this case, a person passing through the sloped ground may easily slip down to the mat.

Furthermore, on a dewy day or on a snowy day in winter, a person may more easily slip down to the mat.

DISCLOSURE OF INVENTION

Technical Problem

An aspect of the present invention provides a grass protection mat which prevents the matt from sinking into a ground, enhances sinking prevention effect by elastically deforming sinking prevention means, and restrains the mat from sliding under or after construction of the mat.

The present invention also provides a grass protection mat that effectively prevents a person from sliding on the mat when the person passes on the mat, especially, the mat constructed on a sloped ground.

Technical Solution

According to an aspect of the present invention, there is provided a grass protection mat comprising: a body member constituting grass penetrating spaces; lug members formed at lower portion of the body member; and sinking prevention means connected between the lug members across the grass penetrating spaces so as to prevent a mat from sinking into a ground.

According to another aspect of the invention, there is provided a grass protection mat comprising: a body member constituting grass penetrating spaces; lug members formed at lower portion of the body member; and sinking prevention means that are connected between the lug members across the grass penetrating spaces and include an extension expanding a ground-contacting area so as to prevent a mat from sinking into a ground.

According to still another aspect of the invention, there is provided a grass protection mat comprising: body member constituting grass penetrating spaces; and plate-shaped sinking prevention means that are provided at lower portion of the body member and outer wall of bottom surface is lower than a center.

According to further still another aspect of the invention, there is provided a grass protection mat comprising: a body member constituting grass penetrating spaces; lug members formed at lower portion of the body member; sinking prevention means linked to the body member or the lug members to prevent a mat from sinking into a ground; and mat sliding prevention means provided in the lug members or the sinking prevention means.

According to further still another aspect of the invention, there is provided a grass protection mat comprising: a body member constituting grass penetrating spaces; protruding pillars provided at upper portion of the body member; and sliding prevention means disposed between the protruding pillars.

According to further still another aspect of the invention, there is provided a grass protection mat comprising: a body member constituting grass penetrating spaces; an outer frame connected to outer walls of the body member to maintain a mat shape; protruding pillars provided at an upper portion of the outer frames; and sliding prevention means disposed between the protruding pillars.

According to further still another aspect of the invention, there is provided a grass protection mat comprising: a body member constituting grass penetrating spaces; and sliding prevention means connected between the body member.

According to further still another aspect of the invention, there is provided a grass protection mat comprising: a body member constituting grass penetrating spaces; an outer frame connected to outer walls of the body member to maintain a mat shape; and sliding prevention means disposed on the outer frames.

According to further still another aspect of the invention, there is provided a grass protection mat comprising: a body member constituting grass penetrating spaces; protruding pillars provided on one or both of the body member and an outer frame connected to outer walls of the body member to maintain a mat shape; and sliding prevention means provided at upper end of the protruding pillar.

BRIEF DESCRIPTION OF THE DRAWINGS

FIG. 1 is a plan view illustrating a grass protection mat according to a first embodiment of the invention.

FIG. 2 is a side view of the grass protection mat shown in FIG. 1.

FIGS. 3A and 3B are a perspective view and a plan view illustrating sinking prevention means of one embodiment provided to the grass protection mat according to the first embodiment of the invention, respectively.

FIGS. 4A to 4C are a perspective view, a plan view, and a side view illustrating a protruding member provided to the sinking prevention means of FIGS. 3A and 3B, respectively.

FIG. 5 is a plan view illustrating a modification example of the sinking prevention means of FIGS. 3A and 3B.

FIGS. 6A and 6B are a side view and a plan view illustrating a connection structure of reinforcement ribs of the protruding member of FIGS. 4A to 4C, respectively.

FIGS. 7A and 7B are a perspective view and a plan view illustrating sinking prevention means of another embodiment provided to the grass protection mat according to the first embodiment of the invention, respectively.

FIGS. 8A and 8B are modification examples of the sinking prevention means of FIGS. 7A and 7B, respectively.

FIGS. 9A and 9B are perspective views illustrating sliding prevention structures of various shape provided in the protruding member of FIGS. 4A to 4C.

FIGS. 10A and 10B are perspective views illustrating sliding prevention structures of various shape provided in the protruding member of FIGS. 4A to 4C.

FIGS. 11A and 11B are front views illustrating a modification example of the sinking prevention means and the protruding member of FIGS. 4A to 4C.

FIG. 12 is a plan view illustrating a grass protective mat according to a second embodiment of the invention.

FIGS. 13A and 13B are cross-sectional views taken along lines A-A and B-B of FIG. 1 illustrating the sinking prevention means provided to the grass protective mat according to the second embodiment of the invention.

FIG. 14 is a perspective view illustrating a modification example of the sinking prevention means of FIGS. 13A and 13B.

FIGS. 15A and 15B are operational state diagrams illustrating an operation of the sinking prevention means of FIGS. 13A, 13B and 14.

FIGS. 16A to 16C are perspective bottom views illustrating another modification example of the sinking prevention means of FIGS. 13A, 13B and 14.

FIG. 17 is a plan view illustrating a grass protection mat according to a third embodiment of the invention.

FIGS. 18A and 18B are a perspective view and a plan view illustrating one sinking prevention means provided to the grass protection mat according to the third embodiment of the invention, respectively.

FIGS. 19A to 19C are perspective views and plan views illustrating another sinking prevention means provided to the grass protection mat according to the third embodiment of the invention.

FIG. 20 is a perspective view illustrating sinking prevention means of further another embodiment provided to the grass protection mat according to the third embodiment of the invention.

FIGS. 21A to 21I are perspective views illustrating partially several mat sliding prevention means provided to the sinking prevention means of the grass protection mat according to the third embodiment of the invention.

FIG. 22 is a perspective view illustrating another mat sliding prevention means and sinking prevention means provided to the grass protection mat according to the third embodiment of the invention.

FIGS. 23A to 23C are perspective views illustrating further another mat sliding prevention means and sinking prevention means provided to the grass protection mat according to the third embodiment of the invention.

FIGS. 24A and 24B are a perspective view and an operational state diagram illustrating lug members provided to the grass protection mat according to the third embodiment of the invention and elastic portion formed in the bar structure included in the sinking prevention means, respectively.

FIG. 25 is a plan view illustrating a grass protection mat according to a fourth embodiment of the invention.

FIGS. 26A and 26B are a perspective view and a plan view illustrating one sliding prevention means provided to the grass protection mat according to the fourth embodiment of the invention, respectively.

FIG. 27 is a perspective view illustrating the sliding prevention means of another embodiment provided to the grass protection mat according to the fourth embodiment of the invention.

FIG. 28 is a perspective view illustrating another sliding prevention means provided to the grass protection mat according to the fourth embodiment of the invention.

FIG. 29 is a side view illustrating the sliding prevention means of FIGS. 26A, 26B, 27, and 28.

FIG. 30 is a side view illustrating a modification example of FIG. 29.

FIGS. 31A and 31B are a perspective view and a side view illustrating further another sliding prevention means provided to the grass protection mat according to the fourth embodiment of the invention.

FIGS. 32A and 32B are perspective views illustrating further another sliding prevention means and modification example thereof provided to the grass protection mat according to the fourth embodiment of the invention.

FIGS. 33 to 36 are plan views illustrating the grass protection mat of various shapes including the sliding prevention means according to several embodiments of the invention.

FIGS. 37 to 39 are plan views illustrating another sliding prevention means provided to the grass protection mat according to the fourth embodiment of the invention.

FIGS. 40 and 41 are plan views illustrating another sliding prevention means provided to the grass protection mat according to the fourth embodiment of the invention.

FIGS. 42 to 44 are a plan view, a perspective view, and a plan view illustrating another sliding prevention means provided to the grass protection mat according to the fourth embodiment of the invention, respectively.

FIGS. 45 and 46 are plan views illustrating another sliding prevention means provided to the grass protection mat according to the fourth embodiment of the invention.

BEST MODE FOR CARRYING OUT THE INVENTION

FIGS. 1 to 11 are views illustrating a grass protection mat according to a first embodiment of the invention, FIGS. 12 to 16 are views illustrating a grass protection mat according to a second embodiment of the invention, FIGS. 17 to 24 are views illustrating a grass protection mat according to a third embodiment of the invention, and FIGS. 25 to 46 are views illustrating a grass protection mat according to a fourth embodiment of the invention.

First, FIGS. 1 to 11 illustrate the grass protection mat 1 according to the first embodiment of the invention.

A basic configuration of the grass protection mat 1 is as follows.

As shown in FIGS. 1 and 2, the grass protection mat 1 includes a body member 10 constituting an overall structure of the mat. The body member 10 are integrally connected to each other to constitute polygonal grass penetrating spaces 12 (grass growing spaces), and preferably, hexagonal, rhombic, or circular grass penetrating spaces 12 for improving the growth or the rooting property of the grass.

Lug members 20 are formed at a lower portion of the body member in the grass protection mat 1. The lug members 20 enable the mat to be supported by the ground and maintain the space between the body member of the mat and the ground. Protruding pillars 30 are provided at an upper portion of the body member to support the load applied to the mat.

Buffer wings 40 are formed at the upper portion of the body member between these protruding pillars to disperse the load. Since the buffer wings 40 are elongated similarly to the grass shape (elongated higher than the protruding pillars), the buffer wings 40 may beautify the appearance of the mat.

In addition, an outer frame 50 is provided outside the body member 10 of the grass protection mat 1 to maintain the outer shape of the mat.

The outer frame 50 of the grass protection mat 1 may be provided with hooking means 60 for connecting the mats and fastening openings 70 for fastening the hooking means 60 of adjacent mats. As shown in FIG. 39, the outer frame 50 may include folded hooks 660' without the fastening openings.

Meanwhile, since the grass protection mats 200, 300 and 600 of the later-described second to fourth embodiments include basic components of the above-mentioned mat, the description thereof will be omitted. However, reference numerals of the same components as the first embodiment are suitably modified in accordance with reference numerals 200, 300, and 600 of the grass protection mat.

Next, as shown in FIGS. 1 and 2, the grass protection mat 1 according to the first embodiment of the invention includes sinking prevention means 80. The sinking prevention means 80 are connected between the lug members 20 facing each other across the grass penetrating space 12 formed with the body member 10 (when viewed from the top) and prevent the mat from sinking into the ground.

As shown in FIGS. 3A and 3B, according to the first embodiment of the invention, the sinking prevention means 80 provided to the grass protection mat 1 may be formed in a bar shape having a predetermined width. The bar-shaped sinking prevention means 80 are connected between the plural lug members 20 facing each other across the grass penetrating space 12.

Preferably, one ends of the bar-shaped sinking prevention means 80 are integrally connected to the lower portions of the lug members 20 facing each other across the grass penetrating space 12, and the other ends thereof are integrally jointed at the center of the grass penetrating spaces 12. For this reason, a central portion 82 is formed to expand an area that contacts with the ground.

When the grass penetrating space formed with the body member in the grass protection mat is a hexagonal shape, six bars are totally connected to six lug members 20 provided at vertexes of the hexagon.

Accordingly, the bottom of the bar and the central portion 82 are contacted and supported to the ground, so that the bar-shaped sinking prevention means 80 can prevent the mat from sinking into the ground. As described above, since the central portion 82 having the jointed bars expands the area that contacts with the ground, it may further prevent the mat from sinking into the ground.

Furthermore, as shown in FIG. 1, these sinking prevention means 80 may be suitably arranged in consideration of the total size of the mat.

As shown in FIG. 3A, it is preferable that a rounded upper face 80a of the sinking prevention means 80 is formed such that the grass are not cut by pressing due to the bar edge.

In addition, as shown in FIG. 3A, the sinking prevention means 80 are integrally connected between the lower portions of the lug members facing each other across the grass penetrating spaces. In this case, the sinking prevention means 80 may be provided with a shape of bar having a curved cross-section (a semi-circular cross-section shape) (for example, pipe having a semi-circular cross-section shape) or a shape of bar having a folded cross-section (a triangular cross-section shape). This bar has an inner space 80b.

It is preferable that the inner space 80b of the sinking prevention means turns toward the ground.

Accordingly, when the sinking prevention means 80 having the curved or folded cross-section are pressed down, since the inner space 80b may elastically spread out, it is possible to effectively prevent the mat from sinking into the ground.

In addition, the bar-shaped sinking prevention means forming the inner space provide a function for preventing the sliding of the mat as compared with the bar having a flat surface.

As shown in FIGS. 4A to 4C, the sinking prevention means forms the central portion such that one ends are connected to the lug members 20 and the other ends are jointed in the grass penetrating space 12a. The protruding member 100 may be integrally formed to protrude upward from the central portion 82.

As shown in FIG. 4C, it is preferable that the protruding member 100 is formed to have the same height as that of the protruding pillar 30 formed at the upper portion of the body member, or be higher than the protruding pillar 30. This is because the protruding member 100 does not provide a supporting force, if the protruding member 100 is lower than the protruding pillar 30.

Accordingly, the protruding member 100 may support the load applied to the mat like the protruding pillar.

As shown in FIG. 5, it is preferable that an expansion end 84 is formed at the outer walls of the central portion 82 of the sinking prevention means according to the invention. The expansion end 84 extends the area which contacts with the ground. In this case, it is possible to further prevent the mat from sinking into the ground by increasing the area which contacts with the ground.

The expansion end 84 formed at the central portion 82 reinforces the structure of the central portion 82 in which the bar-shaped sinking prevention means joint, so that it is possible to reinforce the structure of the above-mentioned protruding member 100.

Next, as shown in FIGS. 6A and 6B, the protruding member 100 provided to the sinking prevention means 80 may be further connected by a reinforcement rib 102 between the body member 10 or the protruding pillar 30.

When the protruding member 100 is pressed down, such reinforcement rib 102 prevents the protruding member 100 from being bent and reinforces the structure of the protruding member.

Namely, like FIG. 6A, when the person or the vehicle (cart of the golf course) moves on the mat, the reinforcement rib 102 prevents the protruding member 100 from being broken easily or prevents the protruding member 100 from being pressed down toward one side.

Especially, when the mat is heavily sunk, this reinforcement rib 102 may further provide a sinking prevention function for preventing the mat from sinking from the body member line or the protruding pillar line.

FIGS. 7 and 8 show sinking prevention means 90 according to another embodiment provided to the grass protection mat 1 according to the first embodiment of the invention.

Namely, the sinking prevention means 90 according to another embodiment includes a connection portion 92 and an extension. The connection portion 92 is connected to the body member 10 or the lug member 20, and the extension is disposed in the grass penetrating space while being connected to the connection portion 92 and extends the area which contacts with the ground.

The extension is provided with a ring 94 (see FIG. 7) or a plate 96 (see FIG. 8) connected to the connection portion 92 and is constructed so as to prevent the mat from sinking into the mat.

Accordingly, the connection portion 92 connected to the body member, the ring 94 or the plate 96 (see FIG. 8) increases the area which contacts with the ground as compared with the bar-shaped sinking prevention means 80 of the first embodiment and strongly prevents the mat from sinking into the ground.

Meanwhile, as shown in FIG. 7A, the connection portion 92 and the ring 94 of the sinking prevention means 90 according to the invention may be provided with a bar shape, or a shape of bar having a curved cross-section (for example, pipe having a semi-circular cross-section shape) or a shape of bar having a folded cross-section with inner spaces 92b and 94b, as described above.

As described above, when the mat is pressed down, since the bar having the inner spaces spreads out, the connection portion 92 and the ring 94 of the sinking prevention means 90 having these inner spaces 92b and 94b prevents the mat from sinking into the ground and prevents the sliding of the mat.

In addition, as shown in FIG. 7A, in the sinking prevention means 90 provided on the grass protection mat according to the second embodiment of the invention, it is preferable that a upper face 94a of the bar-shaped connection portion 92 and the ring 94 is provided with a round shape such that the grass are not damaged.

As shown in FIG. 8, the ring 94 or plate 96 of the sinking prevention means 90 may be formed with a circular or polygonal shape. For example, if the grass penetrating space is a hexagonal shape, the ring or plate may be formed with the hexagonal shape.

In the region where the mat is easily sunk (the region where the ground is smooth, the amount of rain is much, or a great volume of sand is poured over), it is preferable to select the sinking prevention means 90 including the ring or plate serving as the expansion from the above-mentioned sinking prevention means 80 and 90.

On the contrary, in the region (the region where the growth of grass is more important) where the grass penetrating space (growing space) is required, it is preferable to select the bar-shaped sinking prevention means 80 not having the extension (ring or plate) formed across the grass penetrating space.

As shown in FIG. 7A, in case of the sinking prevention means 90, the connection portion 92 is extended in the folded shape downward from the body member 10 instead of the lug member. For this reason, the connection portion 92 may be connected to the ring 94 or the plate 96.

Furthermore, as shown in FIG. 8B, the above-mentioned integrally protruding member 100 may be provided to the plate 96 serving as an extension in the sinking prevention means 90 according to another embodiment of the invention.

Meanwhile, as shown in FIGS. 9A, 9B 10A, and 10B, the protruding member 100 provided to the sinking prevention means 80 and 90 may further include sliding prevention means.

Namely, the upper end of the protruding member 100 may be provided with the sliding prevention means having various shapes, for example, a cross-shaped groove 120a or a cross-shaped projection portion 120b of FIGS. 9A and 9B, or a concave-convex portion 120c or a polygon-shaped projection portion 120d of FIGS. 10A and 10B.

The upper end of the protruding member 100 of this invention may be provided with mat sliding prevention means having various shapes, for example, a concave-convex portion, a concaved groove, a cross-shaped groove, a cross-shaped projection portion, a polygon-shaped groove, a polygon-shaped projection portion, a star-shaped groove, a star-shaped projection portion, and a projection portion (sharp-shaped projection portion).

Accordingly, the protruding member 100 increases the load supporting force of the mat. Further, when the person passes on the mat, it is possible to prevent the person from sliding on the mat by the sliding prevention means having various shapes.

As shown in FIGS. 9 and 10, it is preferable that each shape of the sliding prevention means of the protruding member 100 is formed to be at right angles with the direction passing along the mat or to give a slope to the direction passing along the mat, so that it is possible to improve sliding prevention ability.

Next, as shown in FIG. 11, if the central portion of the bar-shaped sinking prevention means connected between the lower ends of the lug members 20 is formed to protrude upwardly, when the protruding member 100 is pressed down, the sinking prevention means 80 is closely contacted with the ground, but when the load is not applied to the sinking prevention means 80, the sinking prevention means 80 returns again, so that it is possible to prevent the sinking of mat.

Meanwhile, as shown in FIG. 1, the plurality of the sinking prevention means provided to the grass protection mat 1 according to the first embodiment of the invention need only to be arranged at regular intervals on the overall mat.

Next, FIGS. 12 to 16 show the grass protection mat 200 according to the second embodiment of the invention.

Similarly to the grass protection mat of the first embodiment, the grass protection mat according to the second embodiment of the invention may include basic components of the mat, for example, body member 210 forming grass penetrating spaces 212, lug members 220 formed at the lower portion of the body member, protruding pillars 230 and buffer wings 240 formed at the upper portion of the body member, an outer frame 250 formed at the outer wall of the body member, hooking means 260 and fastening openings 270 provided at the outer frame 250.

As shown in FIGS. 12 to 14, the grass protection mat 200 according to the second embodiment of the invention includes the body member 210 forming the grass penetrating spaces 212 and plate-shaped sinking prevention means 280 that are provided at the lower side of the body member 210 and have the bottom surface lower than the center.

As shown in FIGS. 13A and 13B, the sinking prevention means 280 are provided between the lug members 220 formed at the lower portion of the body member 210, and provided at the lower portion of extension portion 282 extended downward from the body member 210 in a shape of a concave plate.

As shown in FIG. 14, the extension portion 282 of the sinking prevention means 280 may be integrally connected between the lug members 220.

The plate-shaped sinking prevention means 280 provided to the grass protection mat 200 according to the second embodiment of the invention may be formed such that both ends of the bottom surface is curved downwardly and the center is recessed.

In addition, the plate-shaped sinking prevention means 280 may be formed in a cone shape in which the center is recessed and the overall outer wall is sloped downward.

Meanwhile, since the concave-shaped bottom surface of the sinking prevention means 280 is formed, as shown in FIG. 15A, when the ground is compressed by the loads (solid-line arrows) applying when the person or vehicle passes along the mat, soil particles are concentrated on the center (dotted arrows) along the concave-shaped (sloped) bottom surface of the sinking prevention means 280. Accordingly, the soil particles are more closely compressed.

If the soil particles are closely compressed, the soil is hardened as much. For this reason, the sinking prevention means 280 more stably supports the load to be applied, so that it is possible to effectively prevent the sinking of mat.

As shown in FIG. 15B, if the load to be applied is large, the sinking prevention means 280 is flattened out, and both ends of the sinking prevention means 280 spread out toward an outside.

Therefore, the soil located at the outside of both ends of the sinking prevention means is compressed so that the particles are close, and the soil to be compressed generates repulsive force for interrupting the flattening of the sinking prevention means 280.

Eventually, since the loads applied to the sinking prevention means 280 are dispersed by the force that sinks the sinking prevention means into the ground and the force that flattens out the sinking prevention means, the sinking prevention means 280 effectively prevents the sinking of mat.

As compared with the flattened plate, the concave plate-shaped sinking prevention means 280 may support a downward load corresponding to the magnitude that adds the soil supporting force for supporting upward the sinking prevention means 280 and the repulsive force for interrupting the flattening of the sinking prevention means 280.

In addition, as shown in FIG. 15B, if the loads to be applied are removed, the flattened sinking prevention means 280 may be returned to the original state in which the bottom surface is concave like FIG. 15A.

Namely, since the sinking prevention means 280 becomes the state in which both ends or the outer wall of the bottom surface lower than the center is supported by the soil in the concaved bottom surface, the recessed center may ascend.

Accordingly, the body member 210 connected to the sinking prevention means 280 ascends as much as the rising height of the center of the sinking prevention means 280, and the mat lifts. For this reason, the width of the mat to be sunk into the ground may be reduced as compared with the general flat form.

As described above, if the loads are applied after construction of the mat on the ground, the concave plate-shaped sinking prevention means 280 having the recessed center flatly bend, and if the loads are removed, the sinking prevention means 280 elastically return to an original state. For this reason, according to the second embodiment of the invention, the sinking prevention means 280 provided to the grass protection mat 200 more effectively prevents the mat from sinking into the ground.

As shown in FIGS. 16A to 16C, grooves 284 for preventing mat sliding are provided at the lower portion of the concave plate-shaped sinking prevention means 280 provided to the grass protection mat 200 according to the second embodiment of the invention so as to prevent the sliding of mat. For example, the grooves 284 for preventing mat sliding may include long-extended grooves, radial grooves or concave-shaped polygonal grooves.

It is preferable that these grooves 284 are formed to traverse the moving direction or to be sloped in the moving direction under construction of the mat in consideration of the moving direction along which moving objects, for example, the persons or carts pass.

FIGS. 17 to 24 show the grass protection mat 300 according to the third embodiment of the invention.

Similarly to the above-mentioned grass protection mat, according to the third embodiment of the invention, the grass protection mat may include basic components of the mat, for example, the body member 310 forming grass penetrating spaces 312, lug members 320 formed at the lower portion of the body member 310, protruding pillars 330 and buffer wings 340 formed at the upper portion of the body member 310, an outer frame 350 formed at the outer walls of the body member, hooking means 360 and fastening openings 370 provided at the outer frame 350.

As shown in FIGS. 18 to 23, according to the third embodiment of the invention, the grass protection mat 300 includes the body member 310 forming the grass penetrating spaces 312, the lug members 320 formed at the lower portion of the body member 310, the sinking prevention means constructed so as to prevent the mat from sinking into the ground by linking with the body member 310 and the lug members 320, and mat sliding prevention means provided to the lug members or the sinking prevention means.

Therefore, it will be described hereinafter about various forms of the sinking prevention means included in the grass protection mat 300 according to the third embodiment of the invention and the mat sliding prevention means provided therein.

First, FIGS. 18 and 19 show the sinking prevention means 410 and 420 provided to the grass protection mat according to the third embodiment of the invention. This sinking prevention means 410 and 420 have the same structure as the sinking prevention means 80 and 90 provided to the grass protection mat 1 according to the first embodiment of the invention.

As shown in FIGS. 18A and 18B, the sinking prevention means 410 may be a bar shape. One ends of the bar-shaped sinking prevention means 410 are connected to the lug members 20 facing each other across the grass penetrating spaces 312 formed with the body member 310 (as viewed from the top), and the other ends of the bar-shaped sinking prevention means 410 are integrally jointed at the center of the grass penetrating space 312 to constitute a central portion 412.

Even though not shown in FIG. 18, referring to FIG. 3A, the bar-shaped sinking prevention means 410 may be a shape of bar having a curved cross-section (a semi-circular cross-section shape) or a shape of bar having a folded cross-section (a triangular cross-section shape) with an inner space. In this case, the inner space contacts with the ground and prevents the sliding of mat.

As shown in FIGS. 19A to 19C, the sinking prevention means 420 includes bar-shaped connection portions 422 and extension such as ring 424 or plate 426. The bar-shaped connection portions 422 are connected to the body member 310 or the lug members 320, and the extension is connected to the connection portions 422 and disposed in the grass penetrating space 312 to expand the area which contacts with the ground. Accordingly, the sinking prevention means 420 is constructed so as to prevent the mat from sinking into the ground.

Although not shown in FIG. 19, referring to FIG. 7, the connection portions and the ring may be a shape of bar having a curved or folded cross-section with an inner space. In this case, the inner space contacts with the ground and prevents the sliding of mat.

Accordingly, the sinking prevention means 410 and 420 provided to the grass protection mat 300 contact the ground and support the ground, so that it is possible to prevent the sinking of mat.

FIG. 20 shows another embodiment of the sinking prevention means 430 included in the grass protection mat 300 according to the third embodiment of the invention.

Namely, the sinking prevention means 430 may be a bar shape that is integrally connected between the lower ends of the lug members 320 adjacent to each other along the body member.

Even in this case, the bar-shaped sinking prevention means 430 may be a shape of bar having a curved or folded cross-section with the inner space that prevents the sliding of mat.

Accordingly, unlike the sinking prevention means 410, the sinking prevention means 430 prevent the mat from sinking into the ground by means of the bar connected between the lug members adjacent to each other along the body member.

Meanwhile, the mat sliding prevention means according to the third embodiment of the invention may be provided as follows.

As shown in FIGS. 21A and 21B, the cross-section of the mat sliding prevention means according to one embodiment of the invention may be in the shape of triangular or circular grooves 500a and 500b dug long along the ground-contacting surface (bottom surface) of the bar or ring of the sinking prevention means.

Alternatively, as shown in FIGS. 21C and 21D, the above mat sliding prevention means may be in the form of projection portions 510 (sharp-shaped) that are integrally formed on the ground-contacting surface of the bar or ring.

As shown in FIGS. 21E to 21G, the above mat sliding prevention means may be in the form of concave-convex portions 520, projection portions 530 (cross-shaped projection portions), or polygonal grooves are integrally formed on the ground-contacting surface of the bar or ring, respectively.

These various shapes of the mat sliding prevention means may be independently or cooperatively provided on the bar or ring one sinking prevention means.

Next, as shown in FIGS. 21H and 21I, the mat sliding prevention means may include projection portions 510 (sharp-shaped) that are integrally formed on the expansion plate 426 of the sinking prevention means or at least one of long-dug grooves 500a (or 500b) that are provided across the plate.

Meanwhile, even though not shown in drawings, the grooves 500a and 500b may be formed at the lower ends of the lug members 320 connecting the sinking prevention means. For example, V-shaped grooves or the projection portions 510 (sharp-shaped) may be formed at the lower ends of the lug members 320.

Since a number of the lug members are also formed at the lower portion in this case, it is possible to prevent the sliding of mat.

FIG. 22 shows another sinking prevention means 440 provided to the grass protection mat 300 according to the third embodiment of the invention and the mat sliding prevention means provided thereon.

Namely, the sinking prevention means 440 may include a sinking prevention plate, for example, a rounded plate that is integrally provided at the lower portion of the lug member 320. The sinking prevention means 440 may also include an angulated plate.

In addition, the ground-contacting surface of the sinking prevention plate 440 formed at the lower portion of the lug member may be independently or cooperatively provided with the above-mentioned mat sliding prevention means, for example, V-shaped grooves 500a (see FIG. 21A) or the projection portions 510 (sharp-shaped).

FIG. 23A shows another sinking prevention means 450 provided to the grass protection mat 300 according to the third embodiment of the invention and the mat sliding prevention means provided thereon.

As shown in FIG. 23A, the sinking prevention means 450 may be constructed with a rounded sinking prevention plate 454 provided at the lower portion of the connection portion 452 that is integrally connected between the lug members 320 adjacent to each other along the body member 310.

Since the sinking prevention plate 454 is horizontally formed at the lower portion of the connection portion 452 that is integrally connected between the lug members 320, the structure of the sinking prevention means 450 is stronger than that of the above-mentioned sinking prevention means.

At this time, if a reinforcement rib 456 is connected between the sinking prevention plate 454 and the connection portion 452, since the sinking prevention means does not bend during contacting with the ground, the sinking of mat is strongly prevented.

Meanwhile, as shown in FIGS. 23B and 23C, the mat sliding prevention means, for example, long-extended grooves 500a or projection portions 510 (sharp-shaped) may be provided on the ground-contacting surface of the sinking prevention plate 454 of the sinking prevention means 450.

As shown in FIGS. 21E to 22G, the mat sliding prevention means may include the concave-convex portions 520, the projection portions 530 (cross-shaped projection portions), or the polygonal grooves 540.

However, since the sinking prevention means 440 and 450 shown in FIGS. 22 and 23A include the rounded sinking prevention plate, the ground-contacting surface of the sinking prevention means 440 and 450 is wider than that of the bar-shaped sinking prevention means as described above. Therefore, the sinking prevention means 440 and 450 may surely prevent the sinking of mat.

FIGS. 24A and 24B show an elastic portion 550 provided to at least the bar-shaped sinking prevention means among the above-mentioned several sinking prevention means. The elastic portion 550 prevents the sinking and the sliding of mat.

The elastic portion 550 includes a groove portion 552 that is extended long along the bar and recessed toward an inner side.

As shown in FIG. 24B, the elastic portion 550 is provided on the ground-contacting surface of the sinking prevention means 410, 420, and 430 included in the grass protection mat 300 according to the third embodiment of the invention. If the load is applied to the mat by the groove portion 552, the elastic portion 550 stretches out while coming in contact with the ground. Accordingly, the ground-contacting area is increased, so that it is possible to prevent the mat from sinking into the mat.

This elastic portion 550 prevents the sliding of mat by stretching out of the groove portion. Especially, it may be further preferable that the inner groove portion 552 of the elastic portion 550 is provided with projection portions 554 (sharp-shaped).

Next, FIGS. 25 to 44 show the grass protection mat 600 according to the fourth embodiment of the invention.

Similarly to the above-mentioned grass protection mat, the grass protection mat according to the fourth embodiment of the invention may include basic components of the mat, for example, body member 610 forming grass penetrating spaces 612, lug members 620 formed at the lower portion of the body member 610, protruding pillars 630 and buffer wings 640 formed at the upper portion of the body member 610, an outer frame 650 formed at the outer walls of the body member 610, hooking means 660 (or 660') provided at the outer frame 650, and fastening openings 670.

According to the fourth embodiment of the invention, the grass protection mat 600 includes the sliding prevention means having various shapes that will be described more fully hereinafter. These sliding prevention means prevent the person from sliding on the mat, when the person passes on the mat.

Especially, these sliding prevention means prevent the person from sliding on the mat, when the person passes on the mat constructed on the sloped region.

First, as shown in FIG. 25, according to the fourth embodiment of the invention, the sliding prevention means included in the grass protection mat 600 is integrally connected between the protruding pillars 630 adjacent to each other.

For example, as shown in FIGS. 26A and 26B, according to the fourth embodiment of the invention, rod-shaped sliding prevention means 710 may be integrally connected between upper ends of two protruding pillars 630 adjacent to each other.

The rod-shaped sliding prevention means 710 easily perform molding process of the mat, and prevent the person from sliding on the mat when the person passes on the mat.

Next, as shown in FIG. 27, according to the fourth embodiment of the invention, bar-shaped sliding prevention means 720 may be integrally connected between upper ends of two protruding pillars 630 adjacent to each other.

Accordingly, the structure of the bar-shaped sliding prevention means 720 may be stronger than that of the bar-shaped sliding prevention means.

As shown in FIG. 27, any one of grooves 722, knurling portions 724, sharp-shaped projection portions 726, or longitudinally angulated edges 728 or the combination thereof may be formed on the upper surface of the bar-shaped sliding prevention means 720 in order to improve the sliding prevention effect.

However, when the following sliding prevention means is in a bar shape, the same reference numerals can be denoted to the grooves, the knurling portions, the sharp-shaped projection portions, the longitudinally angulated edges formed on the upper surface of the bar-shaped sliding prevention mean.

The bar-shaped sliding prevention means shown in FIG. 27 may include an expanded bar shape, that is, a plate shape 740 (see FIG. 43) that is integrally connected between the protruding pillars, while being separated from the body member by increasing the width of the bar.

For example, like FIG. 43 the plate-shaped sliding prevention means 740 may be formed between the protruding pillars 630 instead of the protrusions 616 formed on the body member 610.

Referring to FIGS. 33 to 37 which will be described hereinafter, the plate-shaped sliding prevention means 740 are connected between the protruding pillars.

As shown in FIG. 28, according to the fourth embodiment of the invention, bar-shaped sliding prevention means 730 having a curved or folded cross-section may be provided to the grass protection mat 600 and include the inner space (see 80b of FIG. 3A) that is integrally connected between the upper ends of the protruding pillars 630.

Namely, a pipe-shaped sliding prevention means having a semi-circular cross-section may be also provided.

Accordingly, since the concaved groove is naturally formed in the sliding prevention means 730 including this inner space, it may be possible to perform easily the sliding prevention as compared with the rod or bar-shaped sliding prevention means.

As shown in FIG. 29, these sliding prevention means are integrally connected between the upper ends of the protruding pillars 630 adjacent to each other. Preferably, the height D1 of the sliding prevention means is approximately similar to the height D2 of the protruding pillars.

If the sliding prevention means are disposed to be lower than the protruding pillars, the bottom of shoes contacts with only the protruding pillars, so that the sliding prevention effect is reduced.

The rod-shaped sliding prevention means 710, the bar-shaped sliding prevention means 720, or the bar-shaped sliding prevention means 730 having the curved or folded cross-section with the inner space are connected between the upper ends of the protruding pillars, and the width thereof is smaller that the plate. Therefore, a grass penetrating space 614 is formed between the body member 610.

As shown in FIG. 30, the rod-shaped sliding prevention means 710, the bar-shaped sliding prevention means 720, or the bar-shaped sliding prevention means 730 having the curved or folded cross-section may be connected with the body member by a reinforcement member F, for example, a reinforcement rib.

When the sliding prevention means are pressed down, this reinforcement member F prevents the sliding prevention means from being bent or broken.

FIGS. 31A and 31B show another sliding prevention means included in the grass protection mat 600 according to the fourth embodiment of the invention.

Namely, the grass protection mat 600 may be provided with an integrated type of plate-shaped sliding prevention means 750 that is disposed between the protruding pillars adjacent to each other and integrated with the protruding pillars 630 and the body member 610.

The structure of the integrated type of the plate-shaped sliding prevention means 750 integrated with the body member and the protruding pillars is stronger than that of various sliding prevention means 710, 720, 730, and 740 as described above.

In addition, according to the integrated plate-shaped sliding prevention means 750 integrated with the body member and the protruding pillars, a gap (614 of FIG. 29) is not formed between the body member.

Accordingly, when the person passes on the mat in the golf course, it may prevent hobnailed golf shoes from being stuck in the gap formed between the body member.

Meanwhile, as shown in FIG. 31A, any one of grooves 752, knurling portions 754, sharp-shaped projection portions 756, or longitudinally angulated edges 758 or the combination thereof may be formed on the upper surface of the plate-shaped sliding prevention means in order to improve the sliding prevention effect as well as the bar-shaped sliding prevention means 720.

However, the same reference numerals can be denoted to the grooves, the knurling portions, the sharp-shaped projection portions, the longitudinally angulated edges formed on the upper surface of following plate-shaped sliding prevention mean.

As shown in FIG. 31B, even in the plate-shaped sliding prevention means 750 integrated with the protruding pillars and the body member, it is preferable that the height D2 of the plate-shaped sliding prevention means is approximately similar to the height D1 of the protruding pillars 630. The reason is described beforehand.

Next, as shown in FIG. 32A, protrusion plate-sliding prevention means 760 may also provided the grass protection mat 600 according to the fourth embodiment of the invention. The protrusion plate-shaped sliding prevention means 760 is disposed between two protruding pillars 630 adjacent to each other and integrally formed to protrude from the body member 610 without being integrated with the protruding pillar.

In this case, since the sliding prevention means is separated from the protruding pillar and integrated with the body member, the molding process of the mat is easily performed, and another grass penetrating space 614 may be formed between the protruding pillar 630 and the protrusion plate-shaped sliding prevention means 760.

Although not shown in FIG. 32A, additional sliding prevention means of various shapes 752, 754, 756, and 758 as shown in FIG. 31A may be formed on the upper surface of the protrusion plate-shaped sliding prevention means 760.

As shown in FIG. 32B, a plate-shaped sliding prevention means 770 having a triangular cross-section may be provided instead of the protrusion plate-shaped sliding prevention means 760. The upper end of the plate 770 is angulated.

In this case, the structure of the plate 770 is weaker that that of the plate shown in FIG. 32A. However, since the upper end thereof is angulated, there may be advantageous in the sliding prevention effect.

In addition, even though not shown in drawings, the plate-shaped sliding prevention means 770 having the triangular cross-section may be provided instead of the integrated plate 750 shown in FIG. 31.

As described above, various sliding prevention means 710 to 770 included in the grass protection mat 600 according to the fourth embodiment of the invention may be independently arranged in the overall mat or be arranged in the overall mat every each unit, like FIG. 25. Furthermore, various sliding prevention means 710 to 770 may be arranged in the overall mat so as to be continuously connected one another, like FIG. 33.

As shown in FIGS. 34 to 36, besides the mat having the hexagonal grass penetrating spaces 612 shown in FIGS. 25 and 33, the sliding prevention means may be disposed on the grass protection mats having square, rectangular, rhombic or circular (not shown) grass penetrating spaces 612, respectively.

FIGS. 37 to 39 show the sliding prevention means provided to the outer frame 650 of the grass protection mat 600 according to the fourth embodiment of the invention.

As shown in FIG. 37, in the grass protection mat 600 according to the fourth embodiment of the invention, the protruding pillars 630 are integrally formed at the upper portion of the outer frame 650 that is connected to the outer walls of the body member to maintain the mat form, and various sliding prevention means 710 to 770 may be disposed between the protruding pillars 630.

In this case, the structures of the above-mentioned various sliding prevention means 710 to 770 are equal to each other, except that the body member is substituted with the outer frame in the plate 750 integrated with the protruding pillars, the protrusion plate 760, and the plate 770 having the triangular cross-section.

As shown in FIG. 37, the sliding prevention means may be naturally linked between the protruding pillars of the body member and the outer frame.

FIGS. 38 and 39 show another sliding prevention means provided on the outer frame 650 in the grass protection mat 600 forming the grass penetrating spaces 612 of the hexagonal or square shape.

Namely, block-shaped sliding prevention means 780 may be provided at the upper portion of the outer frame 650. The block-shaped sliding prevention means 780 are integrally formed to protrude from the upper portion of the outer frame 650 at regular intervals or in series.

These block-shaped sliding prevention means 780 may be integrally arranged along the outer frame at regular intervals or in series.

Furthermore, in FIGS. 38 and 39, the block-shaped sliding prevention means are shown in only the upper and lower sides of the outer frame, but may be disposed at the left and right sides of the outer frame.

Reference numeral 660' of FIGS. 34 and 41 denotes a hooking means having a reverse "L" shape into which the outer frame is inserted.

FIGS. 40 and 41 show the grass protection mat 600 according to the fourth embodiment of the invention in which the above-mentioned rod and bar-shaped sliding prevention means 710, 720, and 730 and the plate-shaped sliding prevention means 740 are connected between the protruding pillars 630 and disposed across the grass penetrating spaces 612 (when viewed from the top).

The plate-shaped sliding prevention means show the plate (see FIG. 43) that is connected between the protruding pillars across the grass penetrating space 612.

Accordingly, the sliding prevention means of the rod shape 710 (see FIG. 26), the bar shape 720 (see FIG. 27), the bar shape having a curved or folded cross-section 730 (see FIG. 28), and the plate shape 740 (see FIG. 43) may be connected between the protruding pillars across the grass penetrating space 612.

The sliding prevention effect of these sliding prevention means is higher that that of the above-mentioned sliding prevention means disposed between the protruding pillars along the body member or the outer frame.

In addition, as shown in FIG. 40, since the cross-shaped sliding prevention means is provided at the center of the grass penetrating space 612, the sliding prevention is more effective, and the structure of the sliding prevention means is strong.

Regardless of the hexagonal grass penetrating space of FIG. 40 and the square grass penetrating space 612 of FIG. 41, it is possible to install various sliding prevention means 710, 720, 730, and 740.

FIGS. 42 to 44 show another sliding prevention means provided to the grass protection mat 600 according to the fourth embodiment of the invention.

As shown in FIGS. 42 and 43, the sliding prevention means may be connected between the body member 610 instead of the protruding pillars 630. Therefore, this sliding prevention means may be connected between the protrusions 616 provided at the upper surface of the body member 610.

Namely, the protrusions 616 protruding integrally from the body member 610 irrespective of the protruding pillars may be connected to the sliding prevention means, for example, the rod shape 710, the bar shape 720, the bar shape 730 having the curved or folded cross-section with the inner space, and the plate shape 740 at the position facing the body member 610.

As described above, it is preferable that the height of the protrusions 616 integrated with the body member 610 and the sliding prevention means is approximately equal to the height of the protruding pillars 630. Accordingly, in order to dispose the sliding prevention between the body member, it is required that the protrusions 616 have the same height as the protruding pillars.

Although not shown in FIG. 42, any one of the grooves 722, the knurling portions 724, the sharp-shaped projection portions 726, and the longitudinally angulated edges 728 or the combination thereof may be provided on the upper surface of the bar-shaped sliding prevention means 720 in order to improve the sliding prevention effect, as shown in FIG. 27.

As shown in FIG. 31, any one of the grooves 752, the knurling portions 754, the sharp-shaped projection portions 756, and the longitudinally angulated edges 758 or the combination thereof may be provided on the upper surface of the plate-shaped sliding prevention means 740 shown in FIG. 43 in order to improve the sliding prevention effect.

As shown in FIG. 42, in the grass protection mat 600 according to the fourth embodiment of the invention, the sliding prevention means connected between the body member 610 may be connected to the body member in a straight line or may be arranged at regular intervals every each unit.

As shown in FIG. 44, various sliding prevention means 710 to 740 connected between the body member may be also disposed, although the square-shaped grass penetrating spaces 612 are formed.

In case of forming the grass penetrating spaces 612 of the circular shape, the rhombic shape, or the polygonal shape not shown, various sliding prevention means 710 to 740 may be disposed.

FIGS. 45 and 46 show another sliding prevention means included in the grass protection mat 600 according to the fourth embodiment of the invention.

As shown in FIGS. 45 and 46, this sliding prevention means is provided on the upper end of the protruding pillar 630 formed in one or both of the body member 610 and the outer frame 650 that are connected to the outer walls of the body member to maintain the mat form.

This sliding prevention means integrally formed on the upper end of the protruding pillar 630 are a protruding-pillar-expanded sliding prevention means 790 in which the upper end of the protruding pillar spreads toward both sides to prevent the sliding.

Since the upper end of the protruding pillar 630 spreads in a shape of Y, when the person passes on the mat, it is possible to prevent the sliding as compared with the existing protruding pillars in which the upper end is provided with a spherical surface.

FIG. 45 shows the sliding prevention means provided on the protruding pillar 630 formed at the body member, but the protruding-pillar-expanded sliding prevention means 790 are formed on the upper end of the protruding pillar 630 by disposing the protruding pillar 630 at the outer frame 650.

In view of the sliding prevention, it is further preferable that the protruding-pillar-expanded sliding prevention means 790 are disposed on the mat so that the protruding pillar spread out in the direction equal to the moving direction P.

In view of the sliding prevention, it is preferable to arrange the above-mentioned various sliding prevention means 710 to 780 in the direction 'P' across the moving direction on the constructed mat. Various sliding prevention means 710 to 780 are provided to the grass protection mat 600 according to the fourth embodiment of the invention shown in FIGS. 25, 33, 37, 40, and 42.

Namely, if the sliding prevention means are arranged in the direction 'P' across the moving direction every each unit or in series, since the sliding prevention means contact with each other in the direction (width direction of shoes) across walking of the person passing on the mat, it may effectively prevent the sliding.

In addition, as described above, the sliding prevention means according to various embodiments of the invention may be independently arranged on the mat at regular intervals every each unit or may be continuously connected by means of, for example, the protruding pillars, the body member, and the protrusions.

However, if the size of the grass protection mat is large, it is preferable to closely arrange the sliding prevention means.

The sliding prevention means may be independently or simultaneously disposed on the body member or the outer frame.

A mark "G" indicated in FIGS. 11, 15, and 24 denotes the ground.

INDUSTRIAL APPLICABILITY

According to the above-mentioned grass protection mat, it is possible to protect the grass for a long time by effectively preventing the mat from sinking into the ground after construction of the mat.

In addition, it is possible to more surely prevent the mat from sinking into the ground through deformable sinking prevention means.

It is possible to restrain sliding of the mat under or after construction of the mat through the mat sliding prevention means provided to the sinking prevention means, while preventing the sinking of the mat.

Furthermore, since the grass protection mat prevents the person from sliding on the mat during passing on the mat, the invention may provide the stable grass protection mat.

Accordingly, since the grass protection mat can solve various problems capable of generating under or after construction of the mat, the grass protection mat is very practical.

While the present invention has been shown and described in connection with the preferred embodiments, it will be apparent to those skilled in the art that modifications, and variations can be made without departing from the spirit and scope of the invention as defined by the appended claims.

The invention claimed is:

1. A grass protection mat comprising:
a body member constituting grass penetrating spaces;
plate-shaped sinking prevention means provided at a lower portion of the body member, the plate-shaped sinking prevention means having a bottom surface an outer wall of a bottom surface-being lower than a center of the plate-shaped sinking prevention means;
lug members formed at a lower portion of the body member;
wherein the plate-shaped sinking prevention means are formed at a lower end of an extension portion integrally connected between the lug members, and
wherein the plate-shaped sinking prevention means are bent toward a direction in which the bottom surface is flattened, as load is applied, and are constructed so as to be elastically returned to an original state when the applied load is removed.

2. The grass protection mat according to claim 1, wherein the extension portion of the sinking prevention means extend downward from the body member between the lug members.

3. The grass protection mat according to claim 1, further comprising:
a plurality of protruding pillars formed at an upper portion of the body member;
buffer wings protruding from the body member between the plurality of protruding pillars; and
an outer frame connected to an outer wall of the body member to maintain a mat shape, wherein the grass penetrating spaces are formed in a polygonal or circular shape.

4. A grass protection mat comprising:
a body member constituting grass penetrating spaces;
a plurality of protruding pillars provided at an upper portion of the body member; and
sliding prevention means disposed between the plurality of protruding pillars;
wherein the sliding prevention means is formed in an integrated plate shape configured to be integrally formed on at least one of the plurality of protruding pillars and the body member between the plurality of protruding pillars.

5. A grass protection mat comprising:
a plurality of body members constituting grass penetrating spaces;
an outer frame connected to an outer wall of outer body members of the plurality of body members to maintain a mat shape;
a plurality of protruding pillars provided at an upper portion of at least one of the plurality of body members and the outer frame; and
sliding prevention means disposed between the plurality of protruding pillars;
wherein the sliding prevention means is formed in an integrated plate shape configured to be integrally formed on at least one of the plurality of protruding pillars, at least one of the plurality of body members, and the outer frame between the plurality of protruding pillars.

6. A grass protection mat comprising:
a body member constituting grass penetrating spaces;
a plurality of protruding pillars provided at an upper portion of the body member; and
sliding prevention means disposed between the plurality of protruding pillars;
wherein the sliding prevention means is formed in any one of a rod shape, a bar shape, a bar having a curved cross-section with an inner space, a bar having a folded cross-section with an inner space, or a plate shape, all of which are integrally connected between the plurality of protruding pillars along the body member;
wherein further comprising:
buffer wings and lug members formed at the upper portion and a lower portion of the body member; and
an outer frame connected to an outer wall of the body member to maintain a mat shape;
wherein the body member is constructed to constitute the grass penetrating spaces having any one of a polygonal shape, a rhombic shape, or a circular shape.

7. A grass protection mat comprising:
a plurality of body members constituting grass penetrating spaces;
an outer frame connected to an outer wall of outer body members of the plurality of body members to maintain a mat shape;
a plurality of protruding pillars provided at an upper portion of at least one of the plurality of body members and the outer frame;
sliding prevention means disposed between the plurality of protruding pillars;
wherein the sliding prevention means is formed in any one of a rod shape, a bar shape, a bar having a curved cross-section with an inner space, a bar having a folded cross-section with an inner space, or a plate shape, all of which are integrally connected between the plurality of protruding pillars along the at least one of the plurality of body members and the outer frame;
wherein further comprising:
buffer wings and lug members formed at the upper portion and a lower portion of the at least one of the plurality of body members; and
wherein the at least one of the plurality of body members is constructed to constitute the grass penetrating spaces having any one of the polygonal shape, a rhombic shape, or a circular shape.

* * * * *